US011780352B2

(12) United States Patent
Sugiyama

(10) Patent No.: US 11,780,352 B2
(45) Date of Patent: Oct. 10, 2023

(54) VEHICLE SEAT

(71) Applicant: TS TECH CO., LTD., Asaka (JP)

(72) Inventor: Shinji Sugiyama, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 0 days.

(21) Appl. No.: 17/842,323

(22) Filed: Jun. 16, 2022

(65) Prior Publication Data

US 2022/0348120 A1 Nov. 3, 2022

Related U.S. Application Data

(63) Continuation of application No. 16/987,591, filed on Aug. 7, 2020, now Pat. No. 11,390,197, which is a
(Continued)

(30) Foreign Application Priority Data

Sep. 18, 2013 (JP) .................................. 2013-193494
Sep. 18, 2013 (JP) .................................. 2013-193495
(Continued)

(51) Int. Cl.
*B60N 2/22* (2006.01)
*B60N 2/42* (2006.01)
(Continued)

(52) U.S. Cl.
CPC ......... *B60N 2/4228* (2013.01); *B60N 2/2222* (2013.01); *B60N 2/42745* (2013.01);
(Continued)

(58) Field of Classification Search
CPC ........ B60N 2002/022; B60N 2002/026; B60N 2/22; B60N 2/449; B60N 2/42745;
(Continued)

(56) References Cited

U.S. PATENT DOCUMENTS 7,874,616 B2   1/2011   D'Agostini
8,419,126 B2   4/2013   Nitsuma
(Continued)

FOREIGN PATENT DOCUMENTS

CN   101754883   6/2010
DE    4421946    6/1995
(Continued)

OTHER PUBLICATIONS

International Search Report issued in PCT/JP2014/074685, dated Dec. 2, 2014.
(Continued)

*Primary Examiner* — Ryan D Kwiecinski
(74) *Attorney, Agent, or Firm* — Hamre, Schumann, Mueller & Larson, P.C.

(57) ABSTRACT

The object of the invention is to provide a vehicle seat which can improve degree of freedom in the design of the vehicle seat. A vehicle seat with a seat cushion and a seat back includes: right and left side frames 20 constituting right and left frames of the seat back; a pressure-receiving member 40 disposed between the right and left side frames 20 and configured to receive a load from an occupant; and a driving mechanism 50 disposed at each of right and left sides of the pressure-receiving member 40 and configured to cause a right end portion or a left end portion of the pressure-receiving member 40 to move from an initial position to an advanced position that is located frontward of the initial position or to move from the advanced position to the initial position, wherein the driving mechanism 50 includes a linkage (drive link member 100 and contact link member 200) configured to be connected to the pressure-receiving member 40 and a driving source 52 configured to actuate the linkage, and wherein the linkage is configured to operate when a load equal to or greater than a predetermined amount
(Continued)

is input from the occupant to the pressure-receiving member 40 to cause the pressure-receiving member 40 to move to a backward position that is located rearward of the initial position.

9 Claims, 26 Drawing Sheets

Related U.S. Application Data continuation of application No. 16/230,026, filed on Dec. 21, 2018, now Pat. No. 10,752,136, which is a continuation of application No. 14/917,815, filed as application No. PCT/JP2014/074685 on Sep. 18, 2014, now Pat. No. 10,166,888.

(30) Foreign Application Priority Data

Sep. 18, 2013 (JP) .................. 2013-193496
Sep. 18, 2013 (JP) .................. 2013-193499

(51) Int. Cl.
- *B60N 2/64* (2006.01)
- *B60N 2/66* (2006.01)
- *B60N 2/68* (2006.01)
- *B60N 2/427* (2006.01)
- *B60N 2/02* (2006.01)

(52) U.S. Cl.
CPC .............. *B60N 2/64* (2013.01); *B60N 2/667* (2015.04); *B60N 2/686* (2013.01); *B60N 2002/022* (2013.01); *B60N 2002/026* (2013.01)

(58) Field of Classification Search
CPC .......... B60N 2/72; B60N 2/4228; B60N 2/68; B60N 2/2222; B60N 2/686; B60N 2/986; B60N 2/64; B60N 2/667
See application file for complete search history.

(56) References Cited

U.S. PATENT DOCUMENTS

| | | | | |
|---|---|---|---|---|
| 8,708,409 B2 * | 4/2014 | Nitsuma | ............... | B60N 2/888 297/216.12 |
| 8,876,206 B2 | 11/2014 | Yamaguchi et al. | | |
| 8,955,907 B2 | 2/2015 | Adachi et al. | | |
| 9,061,613 B2 | 6/2015 | Adachi et al. | | |
| 9,079,509 B2 * | 7/2015 | Sugiyama | ............... | B60N 2/02 |
| 9,102,252 B2 | 8/2015 | Sugiyama et al. | | |
| 9,162,594 B2 * | 10/2015 | Adachi | ............... | B60N 2/4228 |
| 9,254,763 B2 | 2/2016 | Shimizu et al. | | |
| 9,283,868 B2 | 3/2016 | Sugiyama | | |
| 9,346,379 B2 | 5/2016 | Adachi et al. | | |
| 9,738,194 B2 * | 8/2017 | Hoshi | ............... | B60N 2/7094 |
| 9,751,434 B2 * | 9/2017 | Sugiyama | ............... | B60N 2/02 |
| 9,896,005 B2 | 2/2018 | Adachi et al. | | |
| 10,166,888 B2 | 1/2019 | Sugiyama | | |
| 2002/0008417 A1 * | 1/2002 | Holst | ............... | B60N 2/6671 297/284.4 |
| 2004/0108760 A1 * | 6/2004 | McMillen | ............... | B60N 2/6671 297/284.4 |
| 2007/0296256 A1 | 12/2007 | Colja et al. | | |
| 2010/0066136 A1 * | 3/2010 | D'Agostini | ........ | B60N 2/42781 297/216.12 |
| 2010/0078974 A1 * | 4/2010 | Nathan | ............... | B60N 2/666 297/284.4 |
| 2010/0176630 A1 | 7/2010 | Nitsuma | | |
| 2010/0181812 A1 * | 7/2010 | Nitsuma | ............... | B60N 2/4228 297/216.13 |
| 2010/0270835 A1 * | 10/2010 | Nitsuma | ............... | B60N 2/888 297/216.12 |
| 2011/0241394 A1 | 10/2011 | Yamaguchi et al. | | |
| 2011/0278891 A1 | 11/2011 | Colja et al. | | |
| 2012/0068506 A1 * | 3/2012 | Yamaki | ............... | B60N 2/1615 297/216.1 |
| 2013/0169010 A1 | 7/2013 | Sugiyama et al. | | |
| 2013/0241254 A1 * | 9/2013 | Sugiyama | ............... | B60N 2/42745 297/260.1 |
| 2013/0270878 A1 | 10/2013 | Adachi et al. | | |
| 2014/0070584 A1 * | 3/2014 | McMillen | ............... | B60N 2/6673 297/284.4 |
| 2014/0125102 A1 * | 5/2014 | McMillen | ............... | B60N 2/6671 297/284.4 |
| 2014/0225412 A1 * | 8/2014 | Sugiyama | ............... | B60N 2/20 297/383 |
| 2014/0312674 A1 * | 10/2014 | Shimizu | ............... | B60N 2/7094 297/391 |
| 2015/0032037 A1 * | 1/2015 | Nakano | ............... | A61H 23/02 601/46 |
| 2015/0042134 A1 * | 2/2015 | Shimizu | ............... | B60N 2/66 297/216.14 |
| 2015/0123435 A1 | 5/2015 | Adachi et al. | | |
| 2015/0183342 A1 * | 7/2015 | Yamaki | ............... | B60N 2/68 297/216.13 |
| 2015/0203001 A1 * | 7/2015 | Akutsu | ............... | B60N 2/7094 297/216.13 |
| 2015/0203013 A1 * | 7/2015 | Akutsu | ............... | B60N 2/64 297/452.18 |
| 2015/0251571 A1 | 9/2015 | Adachi et al. | | |
| 2015/0307006 A1 * | 10/2015 | Hayashi | ............... | B60N 2/0702 297/344.13 |
| 2016/0121761 A1 * | 5/2016 | Nishide | ............... | B60N 2/22 297/284.3 |
| 2016/0214511 A1 * | 7/2016 | McMillen | ............... | B60N 2/986 |
| 2016/0221481 A1 | 8/2016 | Sugiyama | | |
| 2016/0325649 A1 * | 11/2016 | Sugiyama | ............... | A47C 7/72 |
| 2017/0267133 A1 * | 9/2017 | Shimizu | ............... | B60N 2/665 |
| 2017/0334322 A1 * | 11/2017 | Sugiyama | ............... | B60N 2/72 |
| 2018/0022235 A1 * | 1/2018 | Sugiyama | ............... | B60N 2/99 297/284.9 |
| 2018/0147959 A1 | 5/2018 | Adachi et al. | | |
| 2019/0118679 A1 | 4/2019 | Sugiyama | | |

FOREIGN PATENT DOCUMENTS

| | | | | |
|---|---|---|---|---|
| DE | 4421946 A1 * | 6/1995 | .......... | B60N 2/4228 |
| DE | 102008006413 | 2/2009 | | |
| DE | 102013204380 | 9/2013 | | |
| DE | 102013204380 A1 * | 9/2013 | ............... | B60N 2/02 |
| EP | 1712411 | 10/2006 | | |
| EP | 1712411 A2 * | 10/2006 | ............... | A47C 7/46 |
| JP | 61-79414 | 4/1986 | | |
| JP | 2001145539 | 5/2001 | | |
| JP | 2002085189 | 3/2002 | | |
| JP | 2006248414 | 9/2006 | | |
| JP | 2006248414 A * | 9/2006 | ............... | A47C 7/40 |
| JP | 2007-1466 | 1/2007 | | |
| JP | 2007-137129 | 6/2007 | | |
| JP | 2010-57824 | 3/2010 | | |
| JP | 2010179883 | 8/2010 | | |
| JP | 2010195398 | 9/2010 | | |
| JP | 4569293 | 10/2010 | | |
| JP | 2011207442 | 10/2011 | | |
| JP | 2011-230574 | 11/2011 | | |
| JP | 2012-136063 | 7/2012 | | |
| JP | 2013-49356 | 3/2013 | | |
| JP | 2013-132992 | 7/2013 | | |
| JP | 2013151252 | 8/2013 | | |
| JP | 2013189142 | 9/2013 | | |
| JP | 2013189142 A * | 9/2013 | ............... | B60N 2/02 |
| JP | 5488325 | 5/2014 | | |
| JP | 5488325 B2 * | 5/2014 | ............ | B60N 2/427 |
| JP | 2015083454 | 4/2015 | | |
| JP | 2016175435 | 10/2016 | | |
| JP | 2016175435 A * | 10/2016 | .......... | B60N 2/0244 |
| JP | 2017030486 | 2/2017 | | |
| JP | 2017030486 A * | 2/2017 | .......... | B60N 2/0705 |
| KR | 2010120771 A * | 11/2010 | ............... | B60N 2/22 |
| KR | 20100120771 | 11/2010 | | |

(56) References Cited

FOREIGN PATENT DOCUMENTS

| WO | 2006015247 | | 2/2006 | | |
| WO | 2006095455 | | 9/2006 | | |
| WO | WO-2006095455 | A1 * | 9/2006 | ............... | A47C 7/40 |
| WO | 2009011388 | | 1/2009 | | |
| WO | WO-2009011388 | A1 * | 1/2009 | ........... | B60N 2/4228 |
| WO | 2009024321 | | 2/2009 | | |
| WO | 2010122858 | | 10/2010 | | |
| WO | WO-2010122858 | A1 * | 10/2010 | ........... | B60N 2/4228 |
| WO | 2012029821 | | 3/2012 | | |
| WO | 2012086803 | | 6/2012 | | |
| WO | WO-2012086803 | A1 * | 6/2012 | ........... | B60N 2/4228 |
| WO | 2012157099 | | 11/2012 | | |
| WO | WO-2012157099 | A1 * | 11/2012 | ............... | A47C 7/46 |
| WO | 2013031796 | | 3/2013 | | |
| WO | WO-2013031796 | A1 * | 3/2013 | ............. | A47C 9/002 |
| WO | 2013099705 | | 7/2013 | | |
| WO | WO-2013099705 | A1 * | 7/2013 | ........... | B60N 2/4228 |
| WO | 2013137065 | | 9/2013 | | |
| WO | WO-2013137065 | A1 * | 9/2013 | ........... | B60N 2/4228 |
| WO | 2014024585 | | 2/2014 | | |
| WO | 2014024586 | | 2/2014 | | |
| WO | WO-2014024585 | A1 * | 2/2014 | ......... | B60N 2/42745 |
| WO | WO-2014024586 | A1 * | 2/2014 | ........... | B60N 2/4228 |
| WO | WO-2014167638 | A1 * | 10/2014 | ............... | A47C 7/40 |
| WO | 2015041288 | | 3/2015 | | |
| WO | WO-2015041288 | A1 * | 3/2015 | ........... | B60N 2/2222 |
| WO | 2016188590 | | 12/2016 | | |
| WO | WO-2016188590 | A1 * | 12/2016 | ............... | B60N 2/66 |

OTHER PUBLICATIONS

Office Action issued in corresponding Japanese Patent Application No. 2015-063854 dated Mar. 1, 2016, and corresponding English translation.
Office Action issued in corresponding Japanese Patent Application No. 2015-063852 dated Apr. 19, 2016, and corresponding English translation.
Extended European Search Report for European Application No. 14845253.5, dated Aug. 9, 2016, 5 pages.
Office Action issued for Japanese Application No. 2014-190007, dated Sep. 20, 2016, 6 pages including English translation.
Office Action issued for Japanese Application No. 2015-063854, dated Aug. 30, 2016, 6 pages including English translation.
Office Action issued for Japanese Application No. 2013-193496, dated Nov. 8, 2016, 6 pages including English translation.
Office Action issued for Japanese Application No. 2013-193495, dated Nov. 8, 2016, 6 pages including English translation.
Office Action issued for counterpart Chinese Patent Application No. 201480051715.8, dated Feb. 23, 2017, 16 pages including English translation.
Office Action issued for counterpart Chinese Patent Application No. 201480051715.8, dated Aug. 15, 2017, 19 pages including English translation.
Extended European Search Report issued for European Patent Application No. 18155352.0, dated May 29, 2018, 5 pages.
Office Action issued for Japanese Patent Application No. 2017-051718, dated Oct. 2, 2018, 7 pages including English translation.
Office Action issued for Japanese Patent Application No. 2018-116679, dated Apr. 23, 2019, 9 pages including English translation.
Office Action issued for Japanese Patent Application No. 2018-160980, dated Jun. 11, 2019, 4 pages including English translation.
Office Action issued for Chinese Patent Application No. 201810119384.7, dated Sep. 27, 2019, 10 pages including English translation of the Examiner's opinion portion.
Office Action issued for Chinese Patent Application No. 201810118165.7, dated Nov. 29, 2019, 8 pages including English translation of the Examiner's opinion portion.
Office Action issued for Chinese Patent Application No. 201810118036.8, dated Nov. 28, 2019, 8 pages including English translation of the Examiner's opinion portion.
Office Action issued for Japanese Patent Application No. 2019-009874, dated Dec. 17, 2019, 8 pages including English translation.
Office Action issued for Chinese Patent Application No. 201810118165.7, dated Aug. 12, 2020, 4 pages including English translation of the Examiner's opinion portion.

* cited by examiner

FIG.4
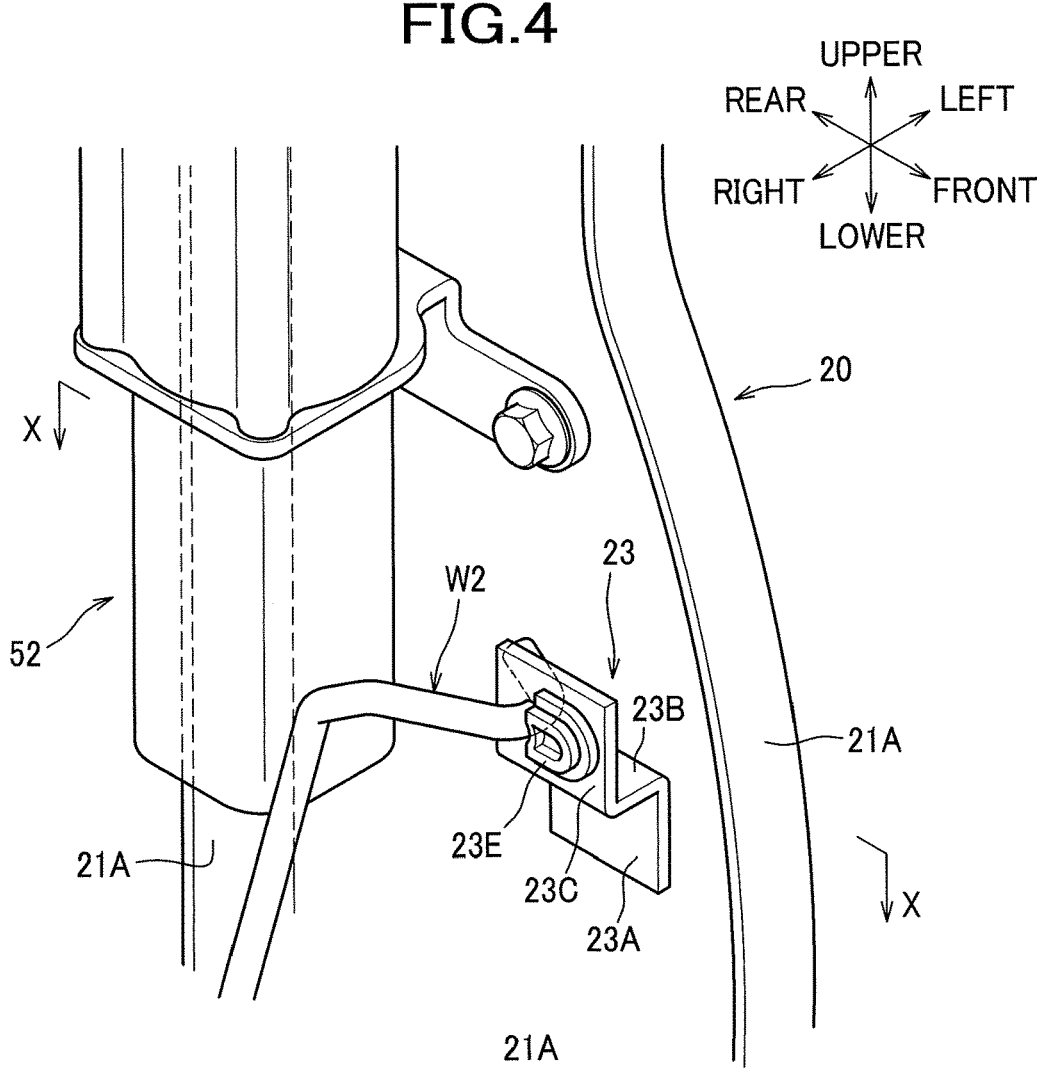
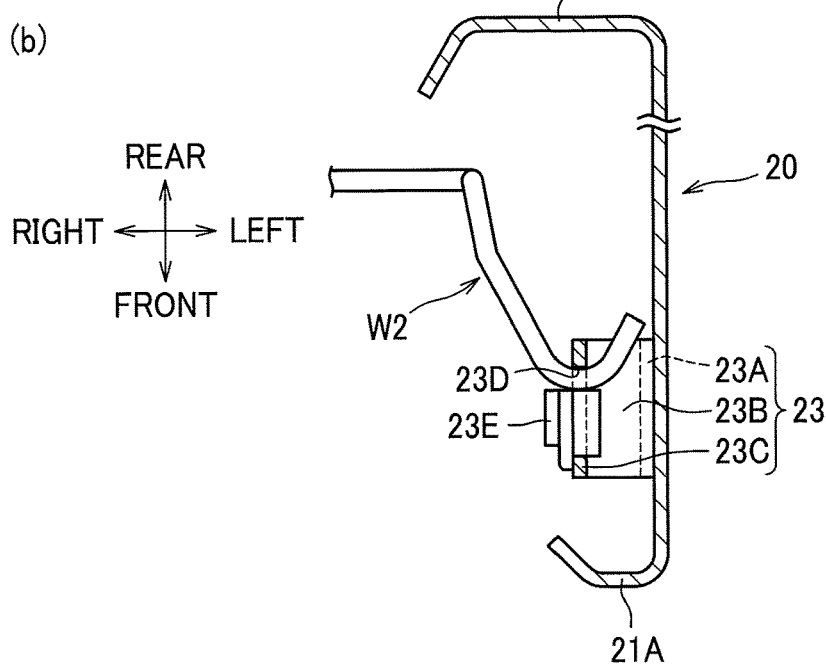

FIG.8
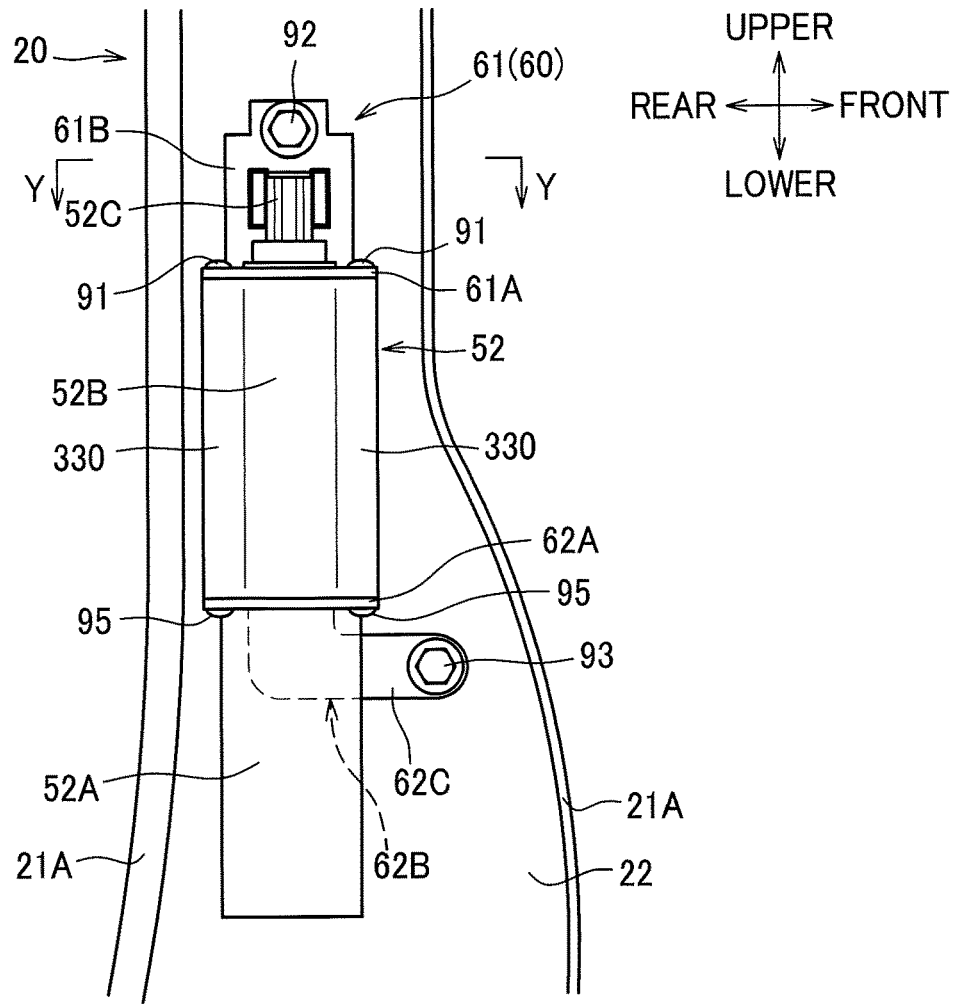
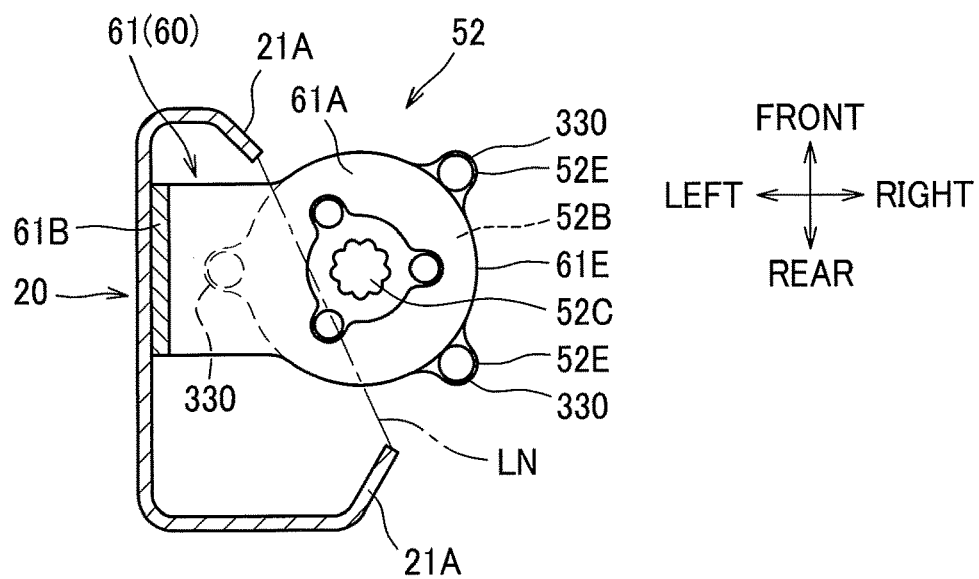

FIG.11
(a) INITIAL POSITION
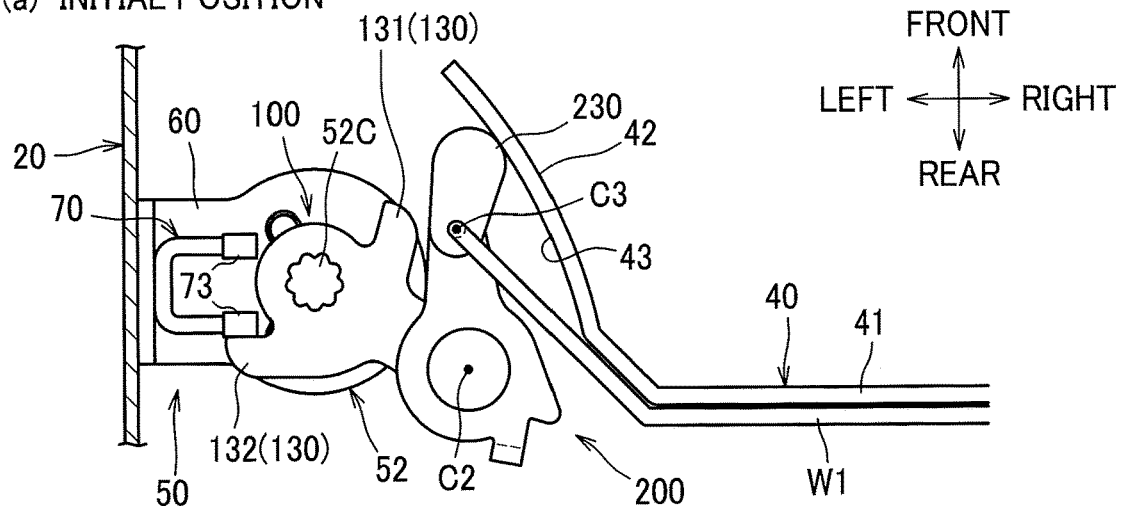
(b)
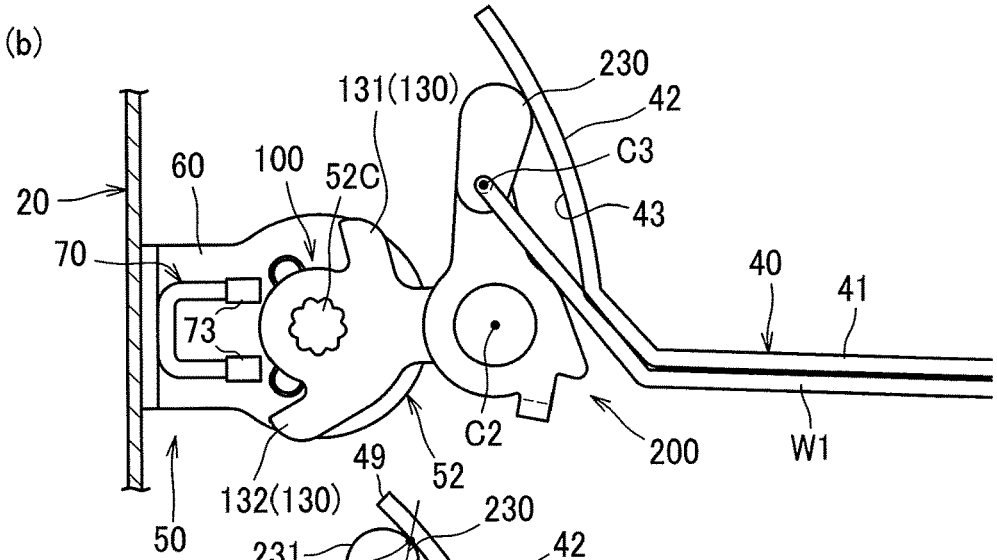
(c) ADVANCED POSITION
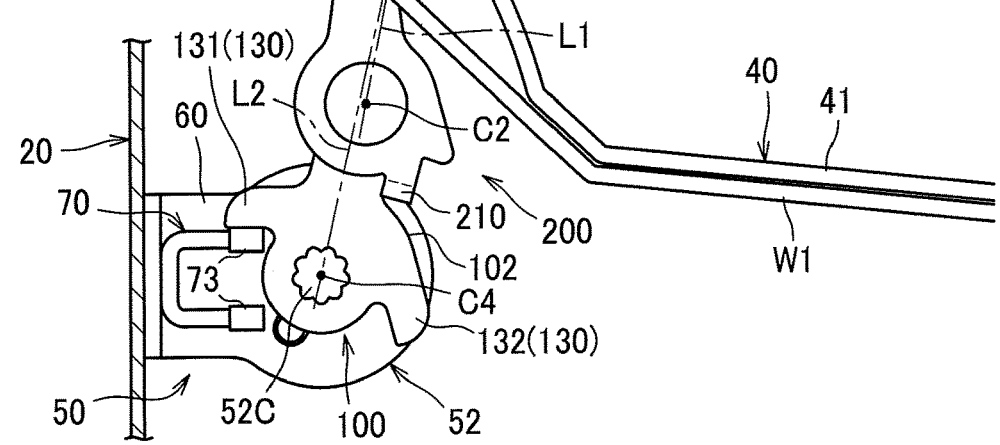

FIG.15
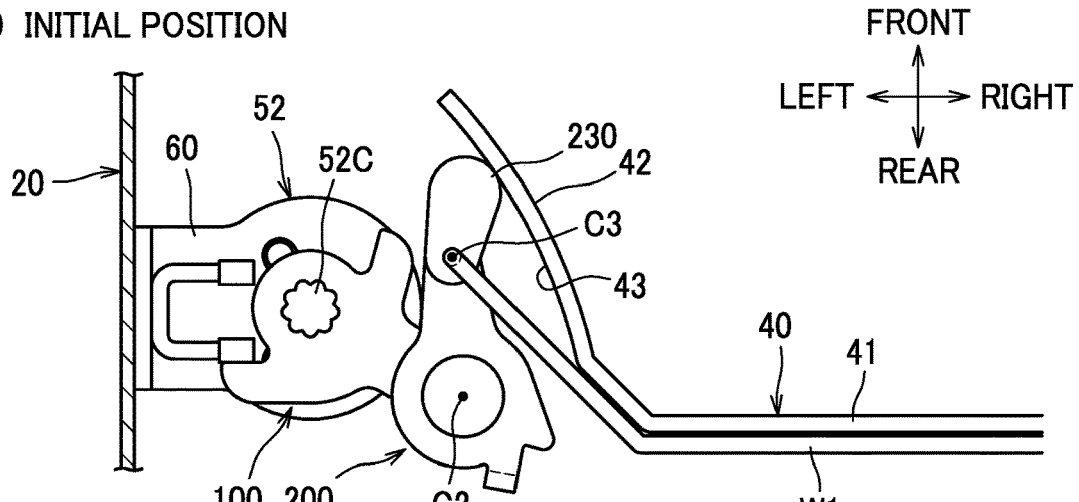
(a) INITIAL POSITION
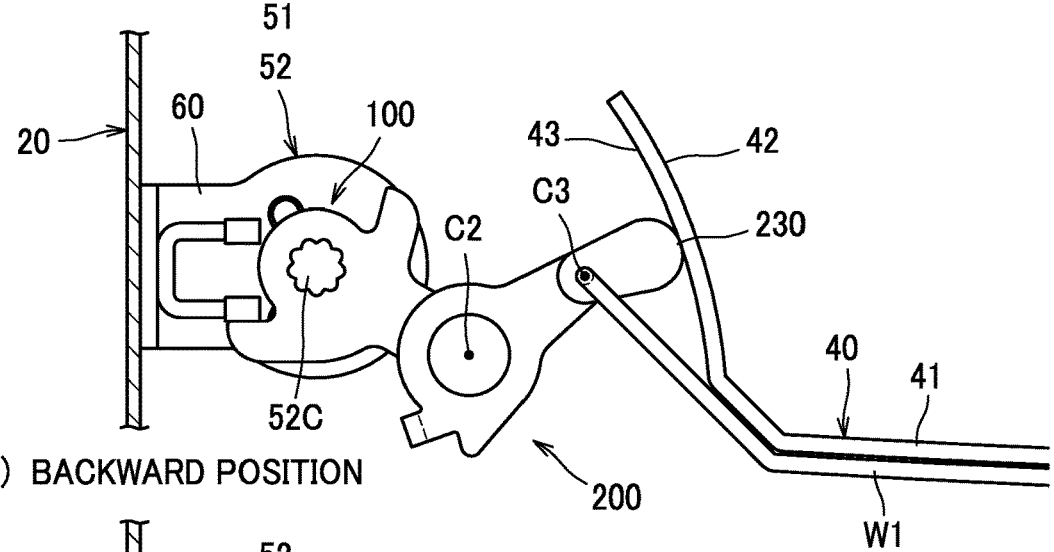
(b)
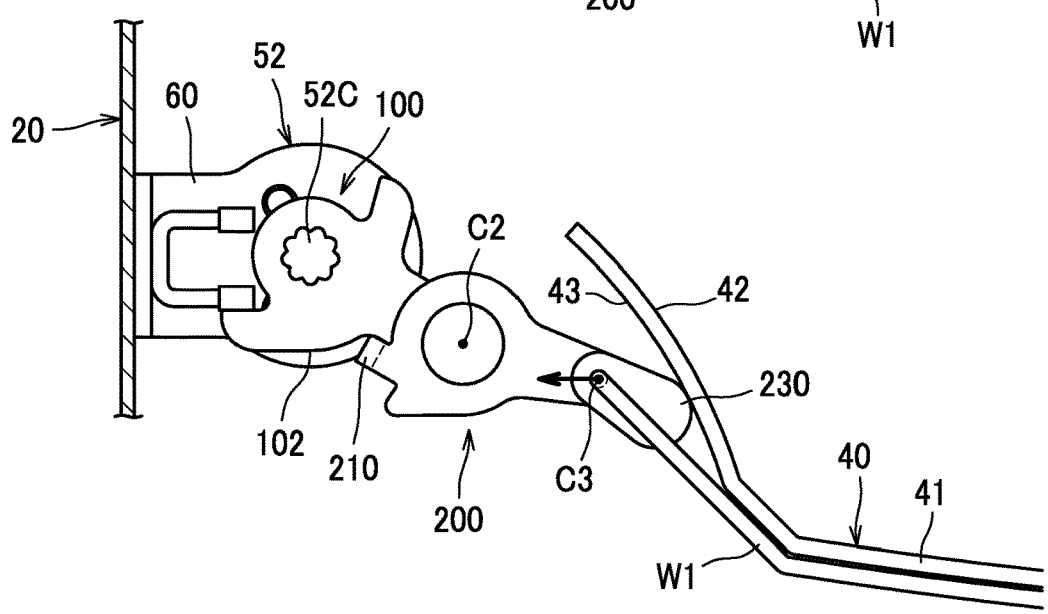
(c) BACKWARD POSITION FIG.18
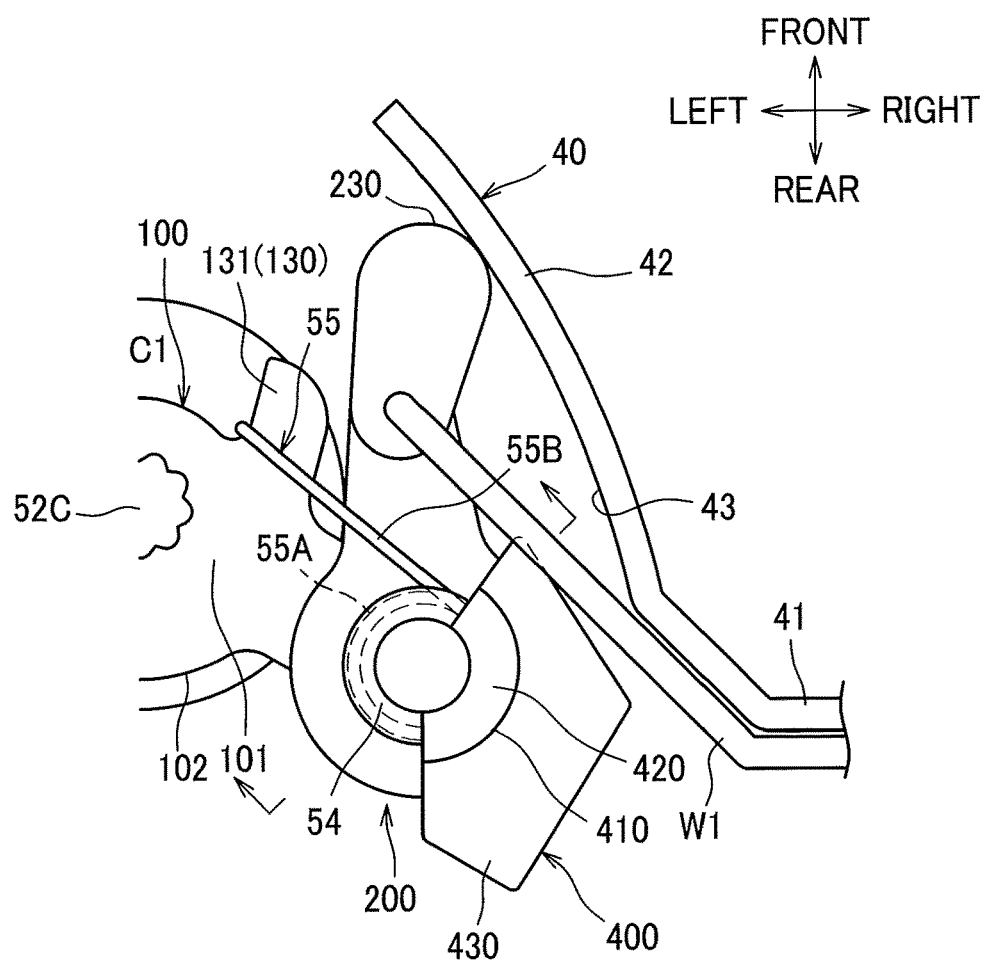
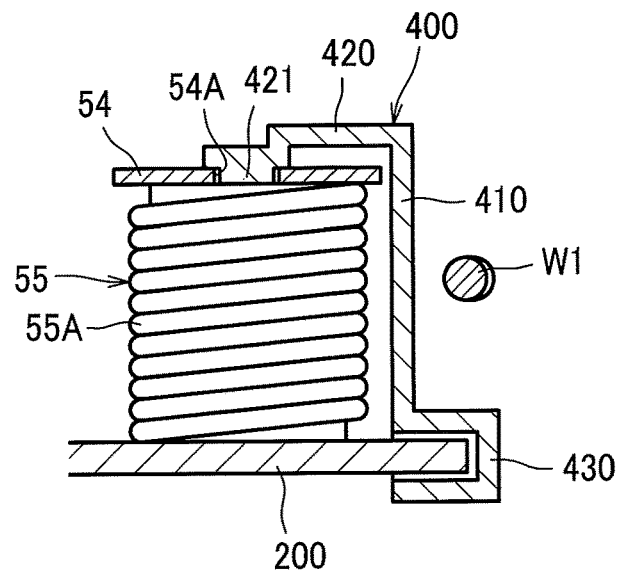

FIG.22
(a)
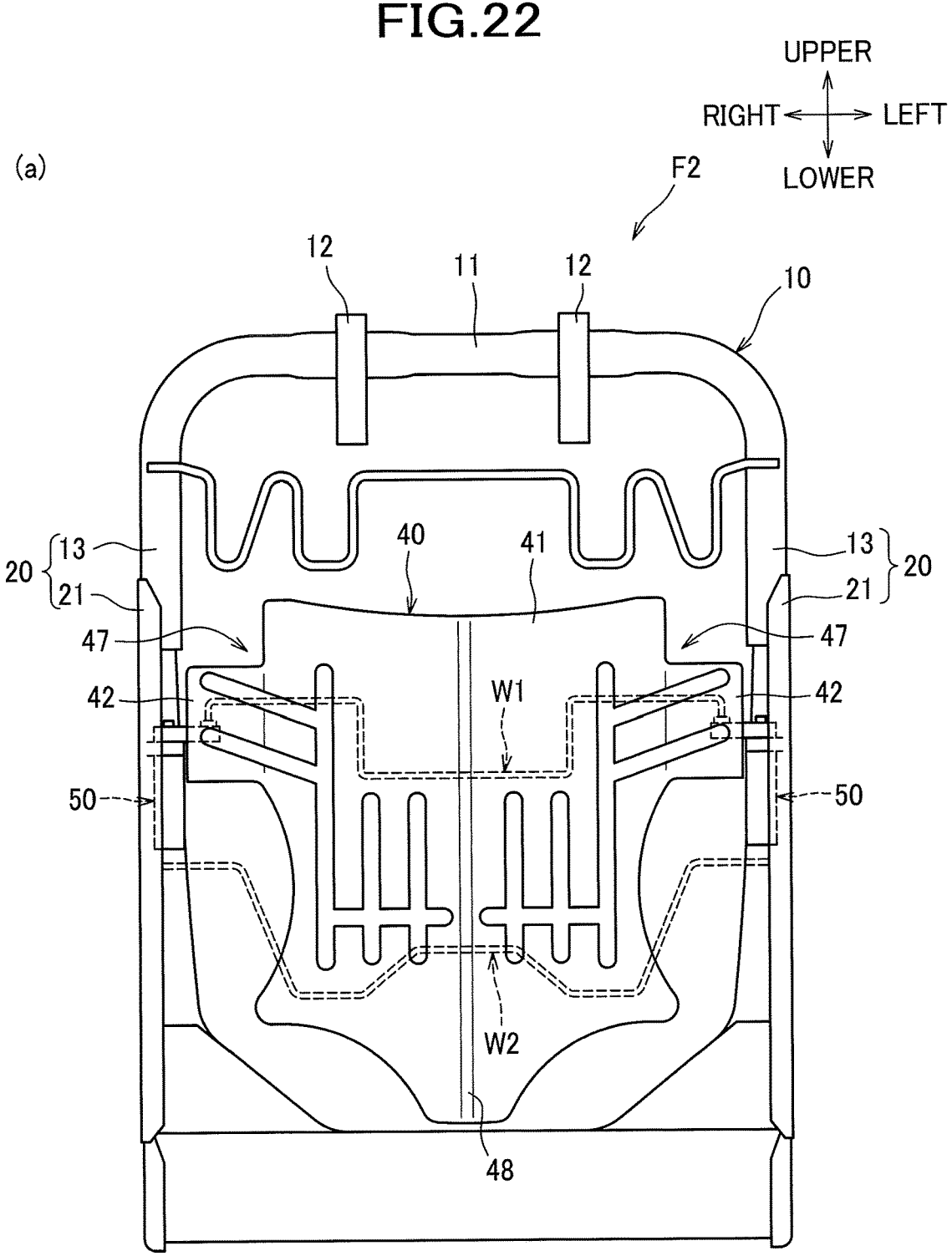
(b)
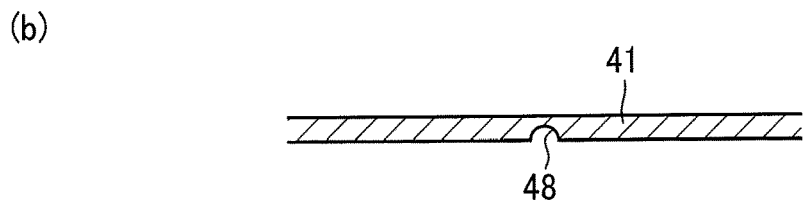

FIG.27
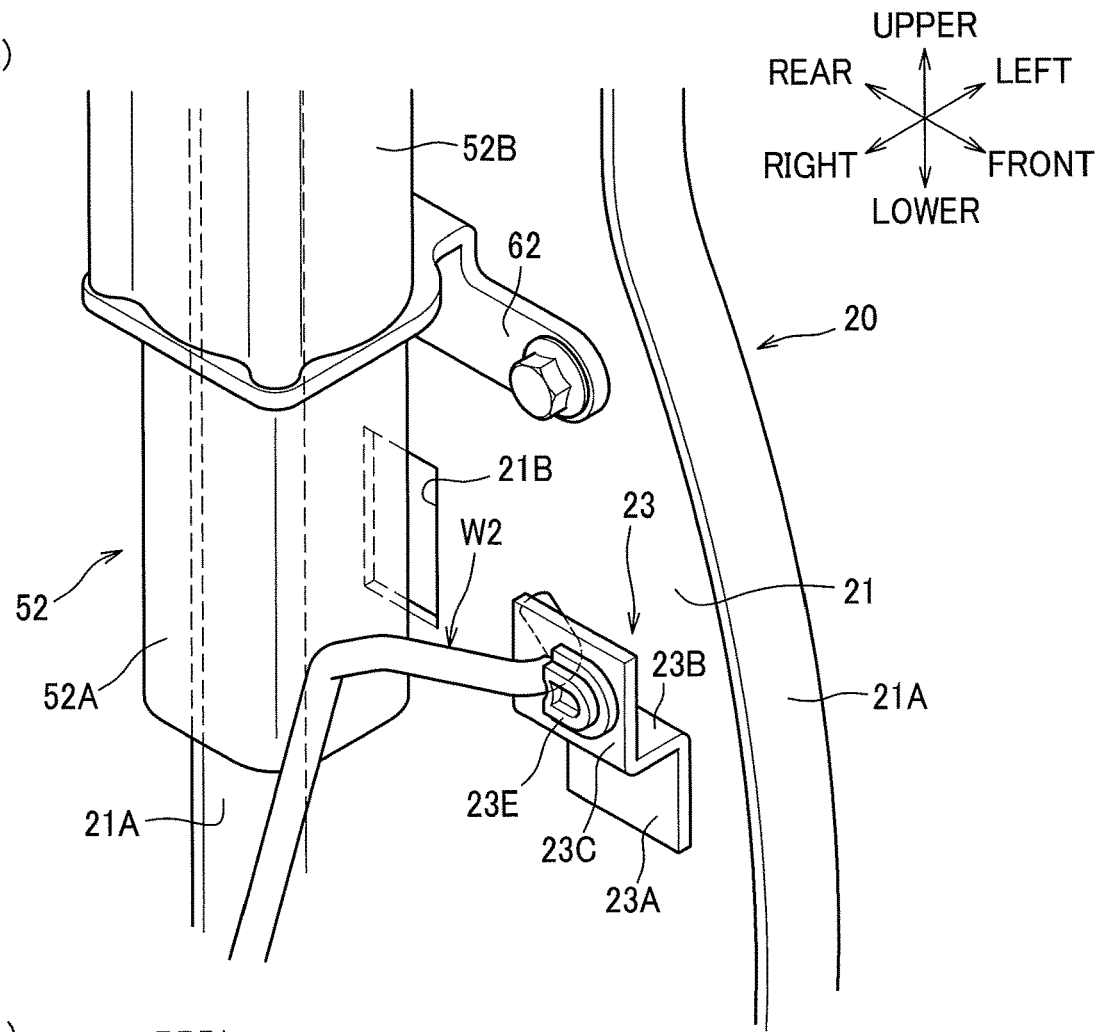
(a)
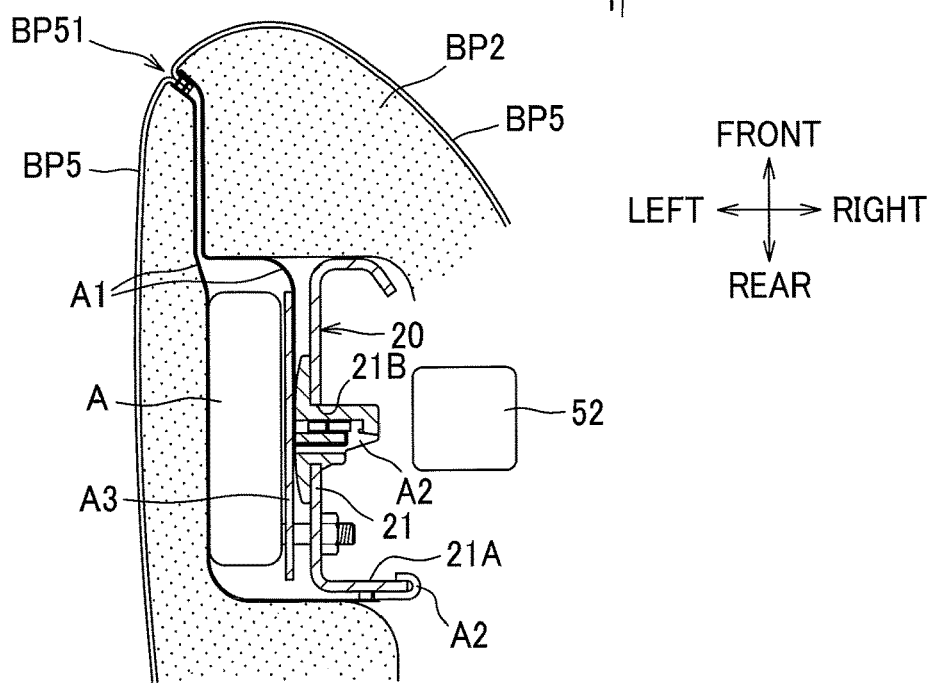
(b)

VEHICLE SEAT

TECHNICAL FIELD

The present invention relates to a vehicle seat with a seat cushion and a seat back.

BACKGROUND ART

Conventionally, there is known a vehicle seat for a car and the like, in which a part of a seat back is oriented to a turning direction so that a centrifugal force applied to an occupant during cornering is appropriately supported by the seat back (see patent Documents 1-3).

For example, a seat described in Patent Document 1 comprises right and left side frames of a seat back, a long link member disposed between the right and left side frames and configured to support an occupant through a movable cushion, and a short link member rotatably provided at each side frame and connected to each side of the long link member, wherein the orientation of the movable cushion is changed by actuating the link.

A seat device described in Patent Document 2 comprises a back plate disposed between right and left side frames of a seat back and having swingable end portions configured to be movable frontward and rearward relative to the right and left side frames, a link member configured to be rotatable frontward and rearward relative to the right and left side frames and to cause a swinging motion of the back plate, and a driving source for rotating the link member, wherein the back plate is oriented toward a turning direction of the vehicle by rotating the link member.

Further, there is known a vehicle seat comprising a pressure-receiving member disposed between right and left side frames and configured to receive a load from an occupant, wherein when the car is rear-ended by another car or when the car collides at the rear portion thereof with another car or a structural object while reversing (i.e., rear-end collision), a load from the occupant causes the pressure-receiving member to move rearward so that the upper body of the occupant can sink into a seat back (see Patent Document 3). With this configuration, the head of the occupant quickly approaches to a headrest and thus gets supported by the headrest, so that an impact imparted to the neck of the occupant due to the rear-end collision can be reduced.

CITATION LIST

Patent Literature

Patent Document 1: JP4569293 B2
Patent Document 2: JP2013-49356 A
Patent Document 3: JP2012-136063 A

SUMMARY OF THE INVENTION

However, if the function of appropriately supporting an occupant during cornering and the function of reducing an impact in the rear-end collision are both realized in a conventional vehicle seat, it is necessary that the vehicle seat has to include a mechanism for changing the orientation of a part of the seat back as well as a mechanism for allowing a rearward movement of the pressure-receiving member. These mechanisms may disadvantageously occupy a large space within the seat back, which makes it difficult to arrange other mechanisms or to reduce the size of the seat; as a result, there is a possibility to limit the degree of freedom in the design of the vehicle seat.

Further, it is desirable that in the vehicle seat, a movable member (e.g., back plate) to be movable relative to a frame and a link member to be rotatable relative to the frame are smoothly operated.

In the conventional art, it is difficult to precisely regulate the amount of rotation of the link member because the amount of rotation of the link member (inclination of the back plate) is regulated by controlling actuation and stoppage of the driving source.

Further, it is necessary that various parts such as the link member and the driving source are arranged in limited space of the vehicle seat while suppressing increase in size of the vehicle seat. Therefore, a compact structure is desirable for these parts themselves and peripheral space of these parts.

In view of the above background, it is an object of the present invention to provide a vehicle seat which can improve the degree of freedom in design.

Also, it is an object of the present invention to provide a vehicle seat in which the link member and the movable member are smoothly operated.

Also, it is an object of the present invention to provide a vehicle seat which can precisely regulate the amount of rotation of the link member.

Also, it is an object of the present invention to provide a vehicle seat in which the size of the driving source and the structure around the driving source can be downsized.

The present invention proposed to attain one or more of the above objects provides a vehicle seat with a seat cushion and a seat back, the vehicle seat comprising: right and left side frames constituting right and left frames of the seat back; a pressure-receiving member disposed between the right and left side frames and configured to receive a load from an occupant; and a driving mechanism disposed at each of right and left sides of the pressure-receiving member and configured to cause a right end portion or a left end portion of the pressure-receiving member to move from an initial position to an advanced position that is located frontward of the initial position Or to move from the advanced position to the initial position, wherein the driving mechanism comprises a linkage configured to be connected to the pressure-receiving member and a driving source configured to actuate the linkage, and wherein the linkage is configured to operate when a load equal to or greater than a predetermined amount is input from the occupant to the pressure-receiving member to cause the pressure-receiving member to move to a backward position that is located rearward of the initial position.

With this configuration, the driving mechanism can provide a function of appropriately supporting an occupant by causing the right end portion or the left end portion of the pressure-receiving member to move frontward and rearward during cornering as well as a function of reducing an impact imparted to the neck of the occupant by moving the pressure-receiving member to the backward position in a rear-end collision. This makes it unnecessary to provide within the seat back both the mechanism for changing the orientation of the seat back and the mechanism for allowing a rearward movement of the pressure-receiving member, so that space within the seat back can be ensured to arrange other mechanisms or the seat can be downsized; it is therefore possible to improve the degree of freedom in the design of the vehicle seat.

In the above vehicle seat, the linkage may include a link member configured to be rotatable frontward and rearward relative to the side frame and connected to the pressure-receiving member, and the vehicle seat may comprise a rotation resistive member configured to restrict a rearward rotation of the link member when a load smaller than the predetermined amount is input from the occupant to the pressure-receiving member and to deform when a load equal to or greater than the predetermined amount is input from the occupant to the pressure-receiving member so as to allow a rearward rotation of the link member.

This configuration can prevent the pressure-receiving member from moving to the backward position when the vehicle is in a normal condition without undergoing a rear-end collision.

In the above vehicle seat, the rotation resistive member may comprise a connecting wire configured to connect the pressure-receiving member and the link member.

Further, in the above vehicle seat, the rotation resistive member may comprise an urging member configured to urge the link member to rotate frontward.

In the above vehicle seat, the linkage may include a second link member connected to an output shaft of the driving source, and the link member may be rotatable relative to the second link member.

With this configuration, as compared with the configuration in which one link member is used to move the pressure-receiving member between the initial position and the advanced position, a sufficient moving distance of the pressure-receiving member is ensured with the result that the pressure-receiving member can favorably support the occupant during cornering.

Further, in the above vehicle seat, the linkage may include a link member configured to be rotatable relative to the side frame to actuate the pressure-receiving member; the link member may have a contact portion configured to contact the pressure-receiving member when the pressure-receiving member is caused to move, and as viewed from a direction of an axis of rotation of the link member, the contact portion may have a convexly curved shape.

This configuration makes it possible to lessen the sliding resistance between the contact portion and the pressure-receiving member in the rotating direction of the link member, so that the link member and the pressure-receiving member can be moved smoothly.

In the above vehicle seat, as viewed from a direction orthogonal to the direction of the axis of rotation, the contact portion may have a convexly curved shape.

This configuration makes it possible to lessen the sliding resistance between the contact portion and the pressure-receiving member also in the rotating direction of the link member, so that the link member and the pressure-receiving member can be moved smoothly.

In the above vehicle seat, the contact portion may have a spherical shape.

This configuration makes it possible to lessen the sliding resistance between the contact portion and the pressure-receiving member in all directions, so that the link member and the pressure-receiving member can be moved smoothly.

In the above vehicle seat, the contact portion may be made of plastic resin.

With this configuration, rubbing noise generated between the link member and the pressure-receiving member can be suppressed and the abrasion can be suppressed.

In the above vehicle seat, the link member may comprise a link body, and a cover member provided with the contact portion and configured to cover at least a part of the link body.

With this configuration, each of the link body and the cover member can be made of an optimum material in terms of its function.

Further, in the above vehicle seat, the linkage may include a second link member configured to be rotatable relative to the side frame and to actuate the pressure-receiving member; the driving source may be configured to rotate the second link member; the right-side second link member and the left-side second link member may be independently rotatable to each other; and the second link member may have a stopper portion configured to contact a corresponding side frame or a member fixed relative to the corresponding side frame to restrict a rotation of the second link member.

With this configuration, since the stopper portion of the second link member contacts the side frame or the member fixed relative to the side frame to restrict a rotation of the second link member, the amount of rotation of the second link member can be precisely regulated as compared with the configuration in which the amount of rotation thereof is regulated by controlling the driving source.

In the above vehicle seat, the stopper portion may comprise a first stopper portion configured to restrict a rotation of the second link member in one direction and a second stopper portion configured to restrict a rotation of the second link member in a direction opposite to the one direction.

This configuration makes it possible to precisely regulate the amount of rotation of the second link member both when the second link member rotates in the one direction and when the second link member rotates in the opposite direction.

In the above vehicle seat, the right-side second link member and the left-side second link member each may be formed using a common part.

This configuration makes it possible to reduce the number of parts and to save the effort of parts management, so that reduction in the cost can be achieved. Further, the mix-up between right and left parts can be prevented and the assembling is facilitated.

In the above vehicle seat, the second link member may be shaped as a plate, and the stopper portion may be provided on a side surface surrounding an axis of rotation of the second link member.

With this configuration, the structure of the second link member can be simplified as compared with the configuration in which the stopper portion protrudes from the second link member in a direction of the axis of rotation, so that the second link member having the stopper portion can be easily manufactured. Further, as compared with the configuration in which the stopper portion protrudes from the second link member only in one side in the direction of the axis of rotation, the right-side second link member and the left-side second link member are easily designed to be a commonly applicable part.

The above vehicle seat may further comprise a bracket with which the driving mechanism is fixed to the side frame; and a fixed stopper member fixed relative to the side frame and configured such that a rotation of the second link member is restricted when the stopper portion contacts the fixed stopper member, and the fixed stopper member may be fixed to the bracket.

With this configuration, the positional precision between the second link member (stopper portion) of the driving mechanism and the fixed stopper member can be improved, so that the amount of rotation of the second link member can be more precisely regulated.

Further, in the above vehicle seat, the side frame may have a pair of bent portions formed by bending laterally inward both side portions thereof each located at an end in a width direction; the driving source may comprise a motor, a gearbox configured to accommodate a train of gears for reducing speed with which is transmitted a rotary driving force generated by the motor, and an output shaft configured to output the rotary driving force transmitted with the reduced speed; the gearbox may have a fastening portion protruding radially outward of the output shaft such that a fastening member for closing an axial end portion of the output shaft is disposed in the fastening portion; and as viewed from an axial direction of the output shaft, the fastening portion may be arranged at a position avoiding a straight line connecting ends of the pair of bent portions.

With this configuration, side surfaces of the gearbox except for the fastening portion have recessed shapes with respect to the fastening portion, so that the driving source with the gearbox can be compactly formed. Further, the side surfaces of the gearbox except for the fastening portion and the end portions of the pair of bent portions of the side frame can be arranged closer to each other, so that upsizing of the side frame can be suppressed and the structure around the driving source can be downsized.

In the above vehicle seat, as viewed from the axial direction, the fastening portion may be provided at a plurality of positions, at least one on each side of the straight line.

With this configuration, even if the vehicle seat comprises a plurality of fastening portions, the side surfaces of the gearbox except for the fastening portions and the end portions of the pair of bent portions of the side frame can be arranged closer to each other, so that the structure around the driving source can be downsized.

The above vehicle seat may further comprise a bracket with which the driving source is fixed to the side frame, and the bracket may comprise an engagement portion engageable with one end portion of the driving source located at one end thereof in the axial direction of the driving source, and a fixing portion extending along the side frame from an end portion of the engagement portion located closer to the side frame toward a direction opposite to another end portion of the driving source that is located at another end thereof opposite to the one end in the axial direction of the driving source and fixed to the side frame.

With this configuration, when viewing the side frame from a side where the driving source is fixed to the side frame, the fixing portion does not overlap the driving source, so that the bracket can be easily attached to the side frame and the driving source can be easily fixed to the side frame.

BRIEF DESCRIPTION OF DRAWINGS

FIG. 4 includes a perspective view (a) illustrating a connecting structure by which a side frame of a seat back and a lower connecting wire are connected, and a sectional view (b) taken along the line X-X of (a).

FIG. 8 includes a side view (a) of a driving source, and a sectional view (b) taken along the line Y-Y of (a).

FIG. 11 includes explanatory views (a) to (c) for explaining the operation of the driving mechanism when the car turns to the right.

FIG. 15 includes explanatory view (a) to (c) for explaining the operation of the driving mechanism in a rear-end collision.

FIG. 18 shows a first modification and includes a top view (a) illustrating a cover member, the contact link member, and an upper connecting wire, and a sectional view (b) thereof.

FIG. 22 shows a fifth modification and includes a front view (a) illustrating the pressure-receiving member and the seat back frame and a sectional view (b) of the pressure-receiving member.

FIG. 27 shows a tenth modification and includes a perspective view (a) illustrating the side frame and the driving source and a sectional view (b) of the left end portion of the seat back.

DESCRIPTION OF EMBODIMENTS

One embodiment of the present invention will be described in detail with reference made to the drawings, where necessary.

Figure 1:
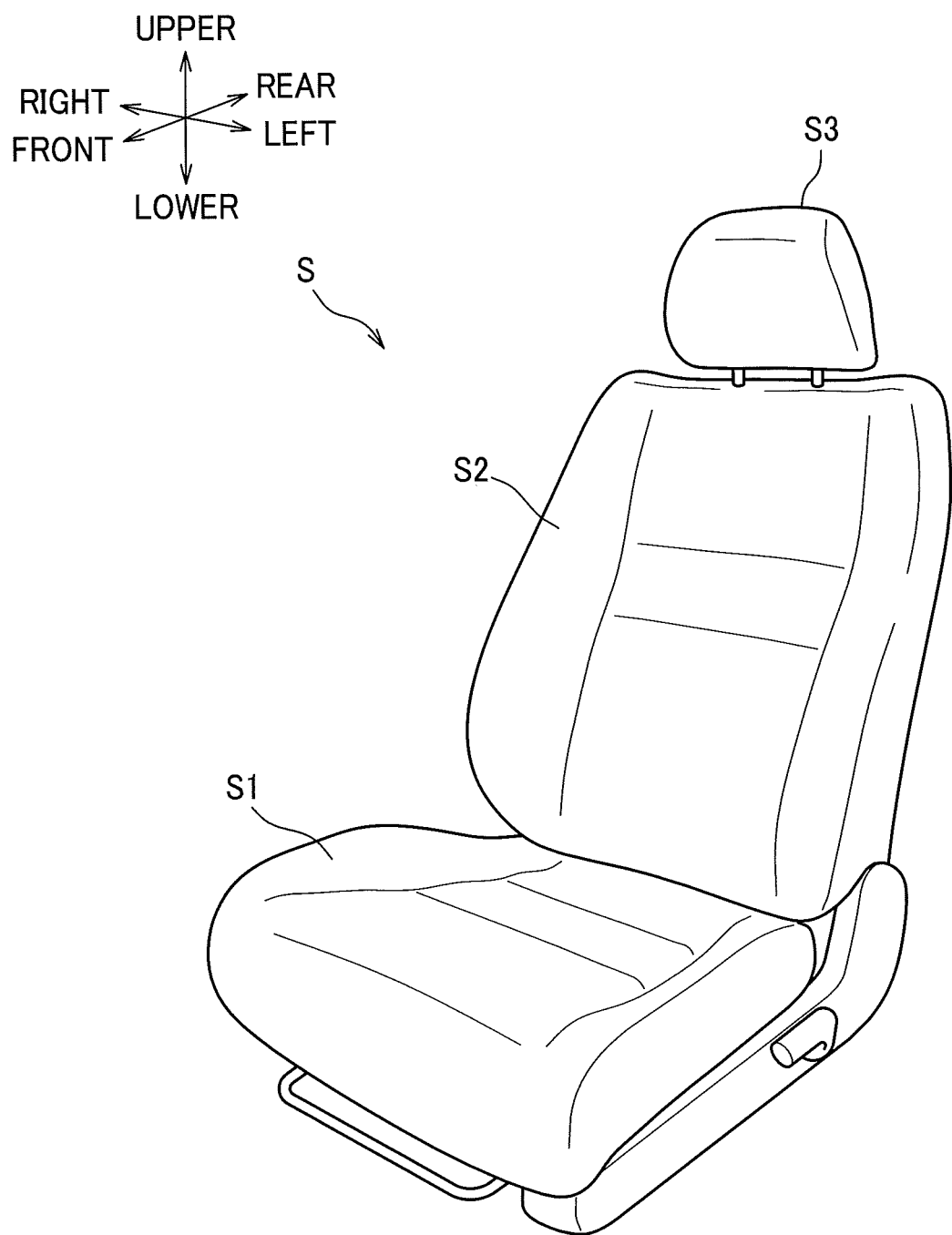
FIG. 1 is a perspective view of a car seat as a vehicle seat according to one embodiment.

As seen in FIG. 1, a vehicle seat according to this embodiment is configured as a car seat S used for a driver's seat and the like of an automobile, and mainly includes a seat cushion S1, a seat back S2, and a headrest S3.

Figure 2:
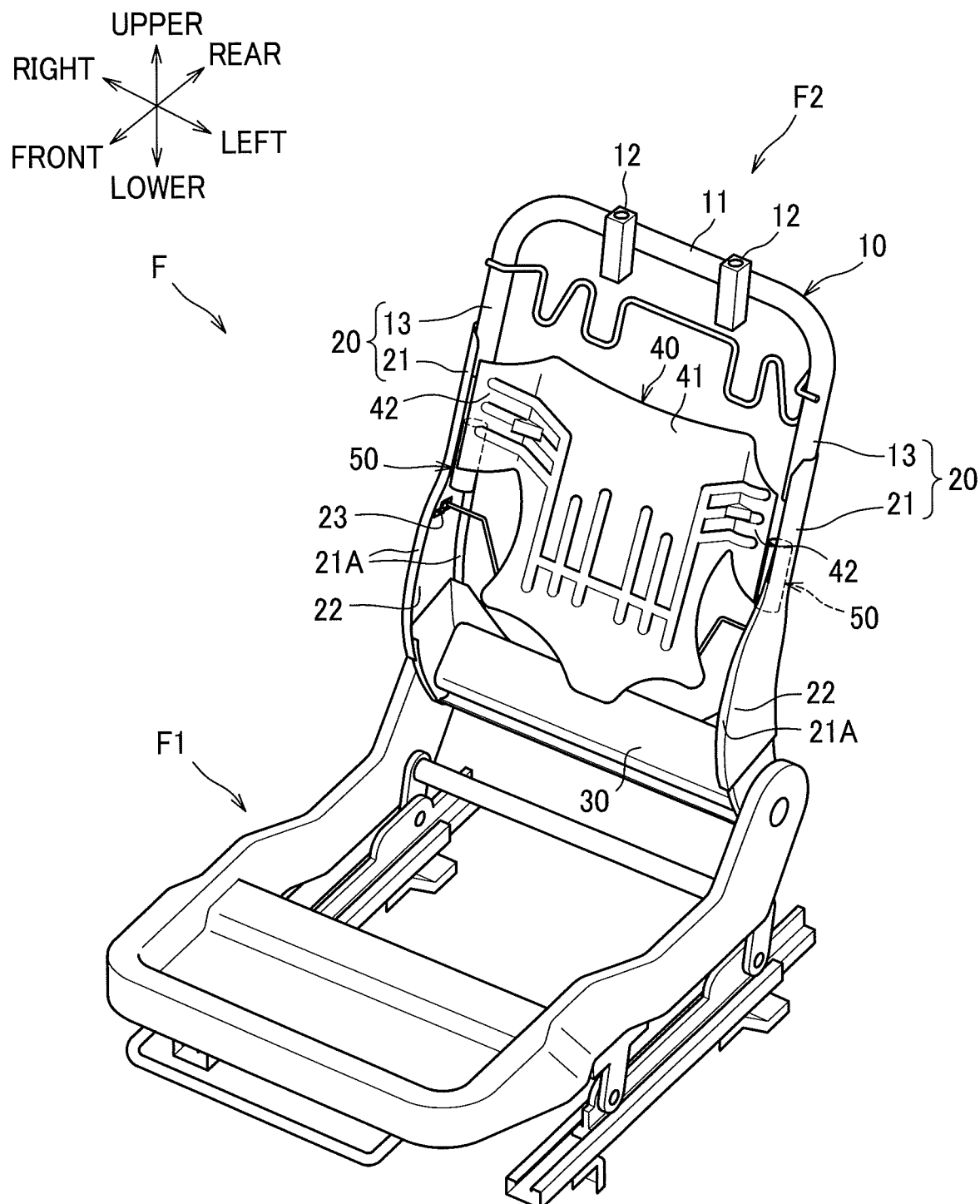
FIG. 2 is a perspective view of a seat frame embedded in the car seat.

A seat frame F shown in FIG. 2 as an example of a frame is embedded in the seat cushion S1 and the seat back S2. The seat frame mainly includes a seat cushion frame F1 constituting a frame of the seat cushion S1, and a seat back frame F2 constituting a frame of the seat back S2. The seat cushion S1 is configured such that the seat cushion frame F1 is covered with a cushion material made of urethane foam or the like, and an outer skin material made of synthetic leather or fabric. The seat back S2 is configured such that the seat back frame F2 is covered with a seat back pad BP made of a cushion material such as urethane foam (see FIG. 12 (a)) and an outer skin material.

The seat back frame mainly includes an upper frame 10, right and left side frames 20 constituting right and left frames of the seat back S2, and a lower frame 30; the upper frame 10, the right and left side frames 20, and the lower frame 30 are joined together, for example, by welding to thereby form a frame-like configuration.

The upper frame 10 is formed by bending a pipe material into a substantially U-shape configuration and includes a lateral pipe portion 11 extending in the lateral (right-left) direction, and a pair of support brackets 12 for attachment of the headrest S3 are fixed by welding to the lateral pipe portion 11. Right and left vertical pipe portions 13 of the upper frame 10 extend in the upper-lower direction; right and left side frame main body portions 21 are joined to lower portions of the vertical pipe portions 13 by welding or the like and made into integral parts to thereby form right and left side frames 20.

Right and left side frame main body portions 21 are arranged laterally opposite to each other. Each of the right and left side frame main body portion 21 is made by press working sheet metal to have an approximately U-shaped cross section having a pair of front and rear bent portions 21A; the front and rear bent portions 21A are formed by laterally inwardly bending both end portions of the side frame main body portion 21 located at both ends in the front-rear direction that is the width direction of the side frame main body portion 21. Each of the side frame main body portions 21 is connected to the corresponding vertical pipe portion 13 with its upper portion holding the vertical pipe portion 13, and the lower portion of the side frame main body portion 21 protrudes frontward farther than the upper portion of the side frame main body portion 21 to provide a bulging portion 22.

Figure 3:
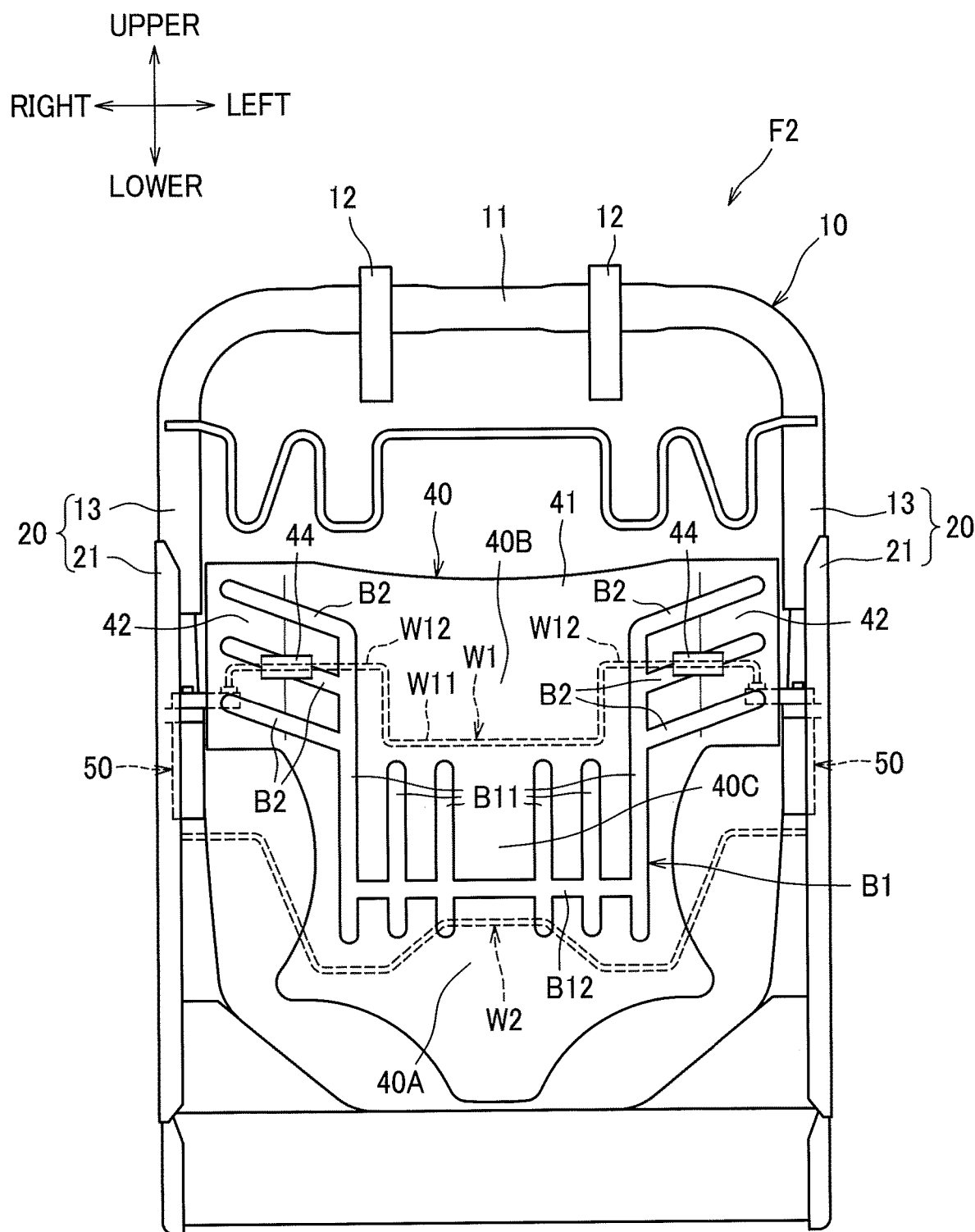
FIG. 3 is a front view of a seat back frame constituting the seat frame.

As seen in FIG. 3, a pressure-receiving member 40 as an example of a movable member and a pair of right and left driving mechanisms 50 are disposed between the right and left side frames 20. Further, a controller 80 (see FIG. 5) for controlling the driving mechanisms 50 (driving sources 52) is provided inside or outside the car seat S.

The pressure-receiving member 40 is a member for receiving a load from an occupant seated on the car seat S through the outer skin material and the seat back pad BP. The pressure-receiving member 40 is made of plastic resin or the like to allow elastic deformation, and includes a pressure-receiving portion 41 disposed to face the back of the occupant, and right and left support portions 42 extending obliquely frontward toward laterally outside directions from upper portions of both right and left ends of the pressure-receiving portion 41; the pressure-receiving portion 41 and the right and left support portions 42 are integrally formed with each other. The pressure-receiving member 40 includes a first portion 40A composed of a lower portion of the pressure-receiving portion 41 and configured to support the lumbar region of the occupant, a second portion 40B composed of an upper portion of the pressure-receiving portion 41 and the right and left support portions 42 and configured to support the occupant at a position above the first portion 40A, and a third portion 40C composed of a middle portion located in the middle of the pressure-receiving portion 41 in the upper-lower direction and configured to connect the first portion 40A and the second portion 40B.

The third portion 40C is provided at a laterally center portion of the pressure-receiving member 40. The lateral width of the third portion 40C is smaller than that of the first portion 40A and that of the second portion 40B. In other words, the pressure-receiving member 40 is shaped such that the middle portion thereof in the upper-lower direction is narrowed at the third portion 40C.

The lateral width of the first portion 40A is larger than that of the third portion 40C. Widening the lateral width of the first portion 40A makes it possible to stably support the lumbar region of the occupant by the first portion 40A.

The pressure-receiving member 40 is configured such that the pressure-receiving portion 41 has a first bead B1 protruding rearward and each of the support portions 42 has second beads B2 protruding rearward. Providing the beads B1, B2 on the pressure-receiving member 40 makes it possible to enhance the rigidity of the pressure-receiving member 40.

The first bead B1 is shaped to recess as viewed from the front side. The first bead B1 consists of a plurality of vertical bead portions B11 extending in the upper-lower direction on the third portion 40C, and a connecting bead portion B12 extending laterally to connect the plurality of vertical bead portions B11. Each of the vertical bead portions B11 extends from the second portion 40B to the first portion 40A via the third portion 40C. The laterally outermost vertical bead portions B11 extend into the second portion 40B, and upper end portions thereof are arranged at an upper portion of the second portion 40B.

The second beads B2 are shaped to recess as viewed from the front side. The second beads B2 are formed at a plurality of locations and spaced apart from each other in the upper-lower direction; the second beads B2 extend from laterally outer end portions of the support portions 42 toward the first bead B1 and are connected to the laterally outermost vertical bead portions B11. This configuration makes it possible to enhance the rigidity at the boundary (portions bent along the illustrated line) between the pressure-receiving portion 41 and the support portions 42.

The second beads B2 extend diagonally relative to the horizontal plane. To be more specific, the second beads B2 extend obliquely from the first bead B1 in laterally outward and upward directions.

Further, at each boundary located between the pressure-receiving portion 41 and the support portion 42, a relief portion 44 having a recessed rear surface is formed in a position corresponding to an upper connecting wire W1 which will be described later (see also FIG. 5). In this embodiment, the relief portion 44 is located in a position overlapping the second bead B2 that is provided in the middle portion in the upper-lower direction.

The pressure-receiving member 40 is connected in such a manner as to be movable in the front-rear direction relative to the right and left side frames 20 via upper and lower connecting wires W1, W2 as an example of elastic members.

The upper connecting wire W1 extends at the rear side of the pressure-receiving member 40 from one support portion 42 to the other support portion 42. Namely, the upper connecting wire W1 is provided to hold the second portion 40B from the rear side between right and left end portions of the second portion 40B. Further, the upper connecting wire W1 is bent such that a laterally center portion thereof protrudes downward. To be more specific, the upper connecting wire W1 is provided corresponding to the upper portion of the pressure-receiving portion 41, and includes a downwardly-protruding U-shaped bent portion W11, and side portions W12 extending laterally outward from right and left ends of the bent portion W11. The lower portion of the bent portion W11 is positioned lower than the contact position (relief portion 44) at which the upper connecting wire W1 contacts the pressure-receiving member 40, more specifically, positioned substantially at the same height as the lower end of the support portion 42. End portions of the upper connecting wire W1 are connected to the driving mechanisms 50 fixed to the side frames 20 respectively, and by engaging engagement hooks (not shown) formed on an upper portion of the rear surface of the pressure-receiving member 40 with the upper connecting wire W1, the upper portion of the pressure-receiving member 40 is connected to the right and left side frames 20.

End portions of the lower connecting wire W2 are connected to wire attachment portions 23 (see FIG. 4) which are provided on the side frames 20 respectively, and by engaging engagement hooks (not shown) formed on a lower portion of the rear surface of the pressure-receiving member 40 with the lower connecting wire W2, the lower portion of the pressure-receiving member 40 is connected to the right and left side frames 20.

As seen in FIGS. 4 (a) and (b), the wire attachment portion 23 is formed by bending sheet metal or the like, and a fixing piece 23A thereof is fixed to a laterally inner surface of the side frame main body portion 21 by welding, a screw, or the like. The wire attachment portion 23 includes the fixing piece 23A, a connecting piece 23B extending laterally inward from an upper end portion of the fixing piece 23A, and an engagement piece 23C extending upward from a laterally inner end portion of the connecting piece 23B. An oblong hole 23D extending long in the front-rear direction and approximately in the shape of an oval is formed in the engagement piece 23C, and by engaging the end portion of the lower connecting wire W2 into the oblong hole 23D, the lower connecting wire W2 is connected to the side frame 20. Further, a plastic spacer 23E is engaged into the oblong hole 23D at the front of the lower connecting wire W2 to thereby prevent the lower connecting wire W2 from moving frontward and rearward within the oblong hole 23D.

Figure 12:
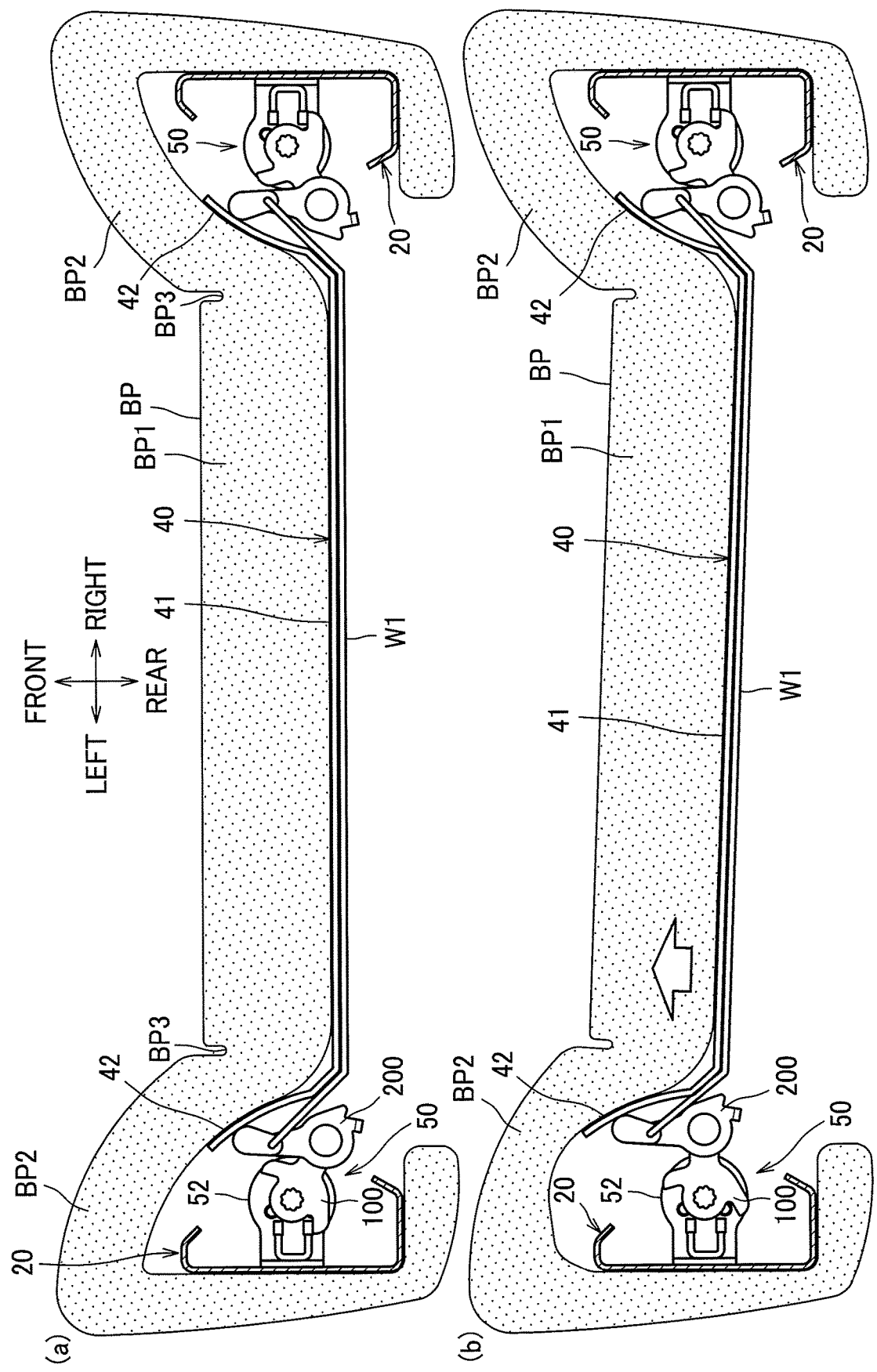
FIG. 12 includes explanatory views (a) and (b) for explaining the operations of the driving mechanism and the pressure-receiving member when the car turns to the right.

As seen in FIG. 12 (a), the seat back pad BP includes a central pad portion BP1 disposed to face the pressure-receiving portion 41, and right and left side pad portions BP2 provided at both right and left sides of the central pad portion BP1 and configured to protrude frontward farther than the central pad portion BP1.

The side pad portion BP2 extends laterally outward from the central pad portion BP1 along the support portion 42 of the pressure-receiving member 40, and then extends rearward along the laterally outer side of the side frame 20, and finally extends laterally inward at the rear side of the side frame 20. The side pad portion BP2 has a space formed between the support portion 42 of the pressure-receiving member 40 and the side frame 20, so that the driving mechanism 50 disposed in this space is prevented from contacting the seat back pad BP.

A first tuck-in groove BP3 is provided between the central pad portion BP1 and each of the side pad portions BP2. The first tuck-in groove BP3 is a groove that is recessed as viewed from the front side and extends in the upper-lower direction. Provided at a bottom portion of the first tuck-in groove BP3 are outer skin attachment members (not shown) disposed vertically for allowing the outer skin material of the seat back S2 to be tucked in the first tuck-in groove BP3. As viewed from the front-rear direction, the first tuck-in grooves BP3 are provided at positions overlapping the right and left end portions of the pressure-receiving member 40. Namely, the pressure-receiving member 40 extends laterally outward from the inner region to the outer region of the first tuck-in grooves BP3, and the support portions 42 are located laterally outside the first tuck-in grooves BP3.

Figure 14:
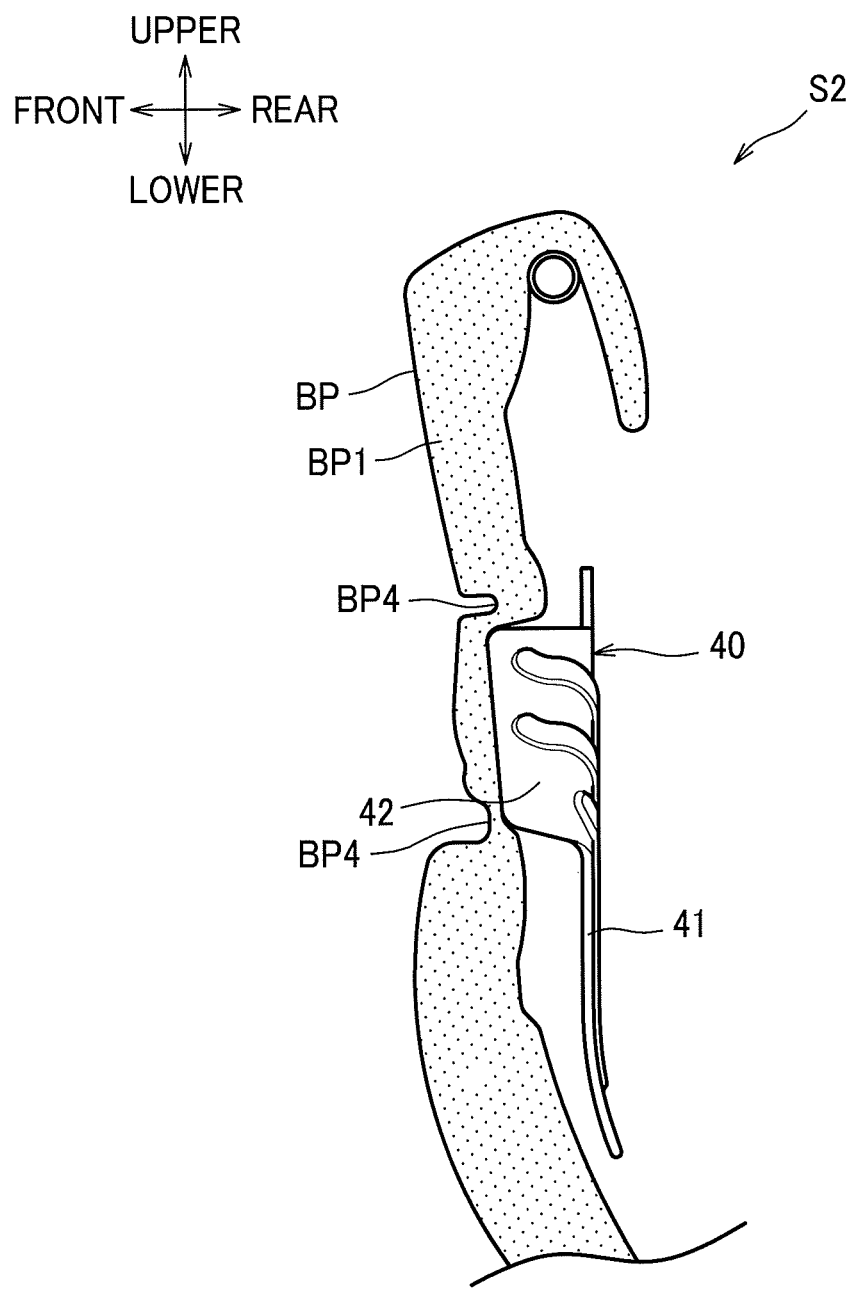
FIG. 14 is a view illustrating the positional relation in the vertical direction between a seat back pad and a support portion.

Further, as seen in FIG. 14, a pair of second tuck-in grooves BP4 are provided in the central pad portion BP1 approximately at a center portion thereof in the upper-lower direction. Each second tuck-in groove BP4 is a groove that is recessed as viewed from the front side and extends in the right-left direction (lateral direction). Provided at a bottom portion of the second tuck-in groove BP4 are outer skin attachment members (not shown) disposed laterally for allowing the outer skin material of the seat back S2 to be tucked in the second tuck-in groove BP4. The pair of second tuck-in grooves BP4 are provided at positions above and below the support portions 42, respectively, of the pressure-receiving member 40. Namely, the support portions 42 and the upper connecting wire W1 are provided at the same height position as that of the region between the pair of second tuck-in grooves BP4. According to this embodiment, the entire support portions 42 are provided at the same height as the region between the pair of second tuck-in grooves BP4, however, the support portions 42 may be provided such that only part thereof is positioned at the same height as the region between the pair of second tuck-in grooves BP4.

Figure 13:
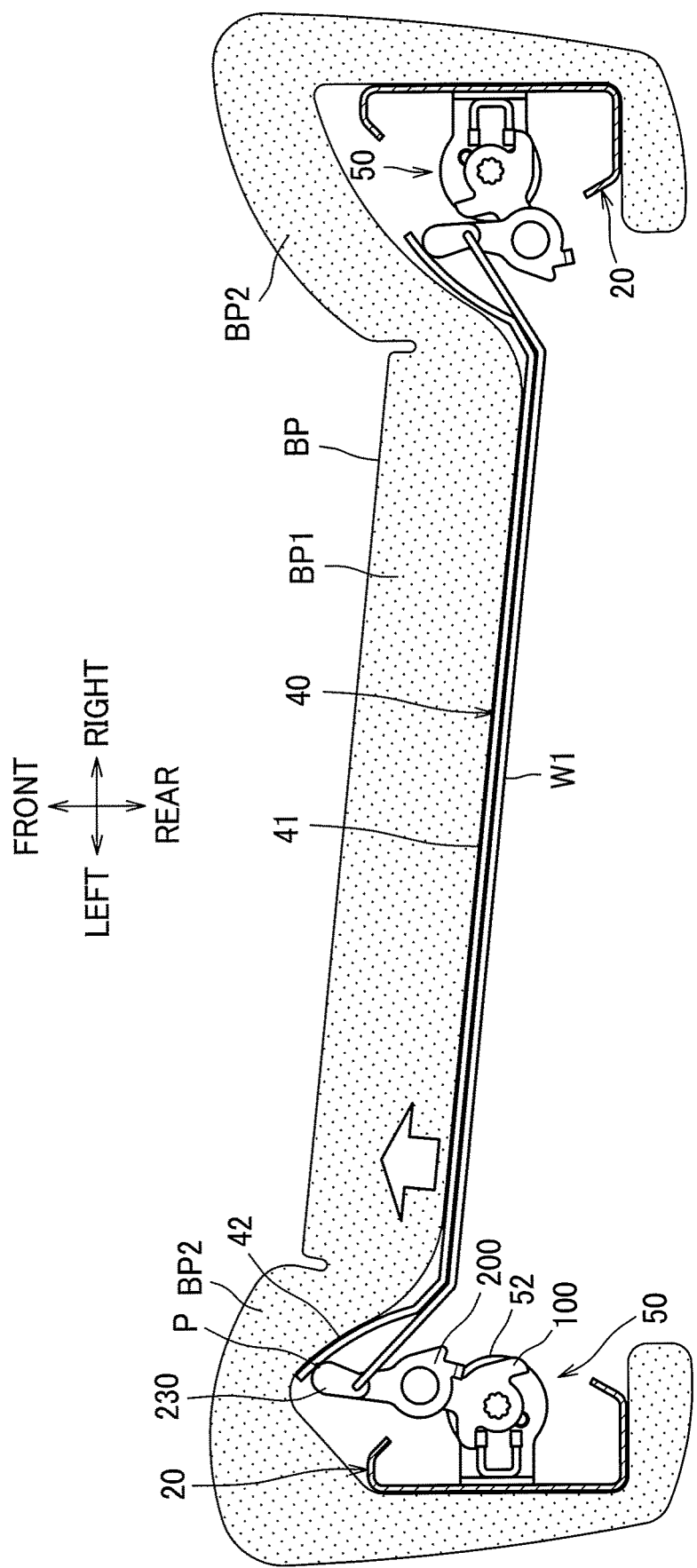
FIG. 13 is a view illustrating the pressure-receiving member when the car turns to the right and the driving mechanism is positioned in an advanced position.
Figure 16:
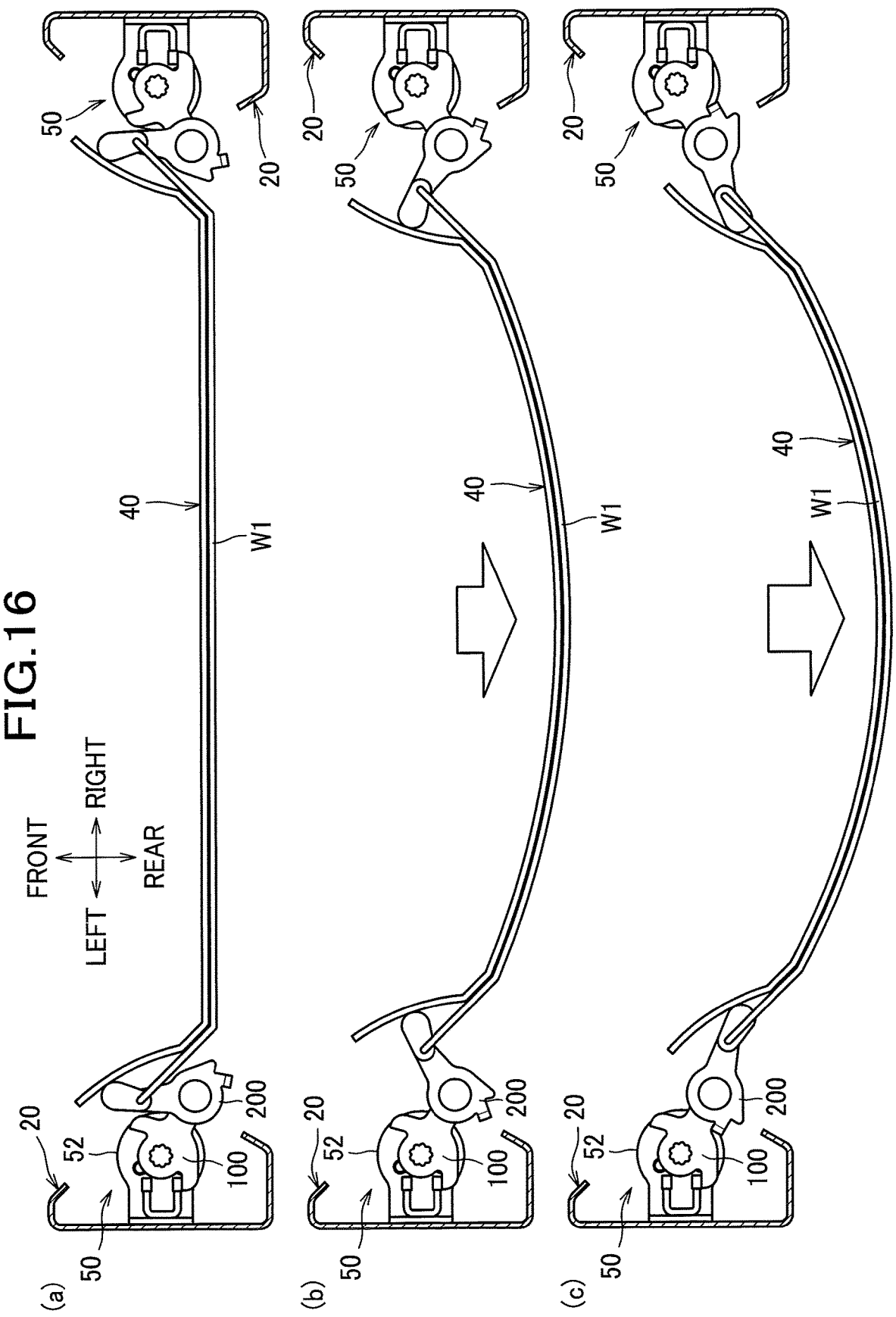
FIG. 16 includes explanatory views (a) to (c) for explaining the operations of the driving mechanism and the pressure-receiving member in the rear-end collision.

As seen in FIG. 3, the driving mechanism 50 is a mechanism for actuating the pressure-receiving member 40, and is provided at each of the right and left side frames and arranged on both right and left sides of the pressure-receiving member 40. Although details thereof will be described later, the driving mechanism 50 is configured to move the right end portion or the left end portion of the pressure-receiving member 40 from an initial position as shown in FIG. 12 (a) to an advanced position that is located frontward of the initial position as shown in FIG. 13 to orient the pressure-receiving member 40 to the right or to the left, or to move (return) the same from the advanced portion to the initial position. Further, the driving mechanism 50 (linkage 51) is configured to operate when a load equal to or greater than a predetermined amount is input from an occupant to the pressure-receiving member 40 to cause the pressure-receiving member 40, to move to a backward position as shown in FIG. 16 (c) that is located rearward of an initial position of the pressure-receiving member 40 as shown in FIG. 16 (a).

Figure 5:
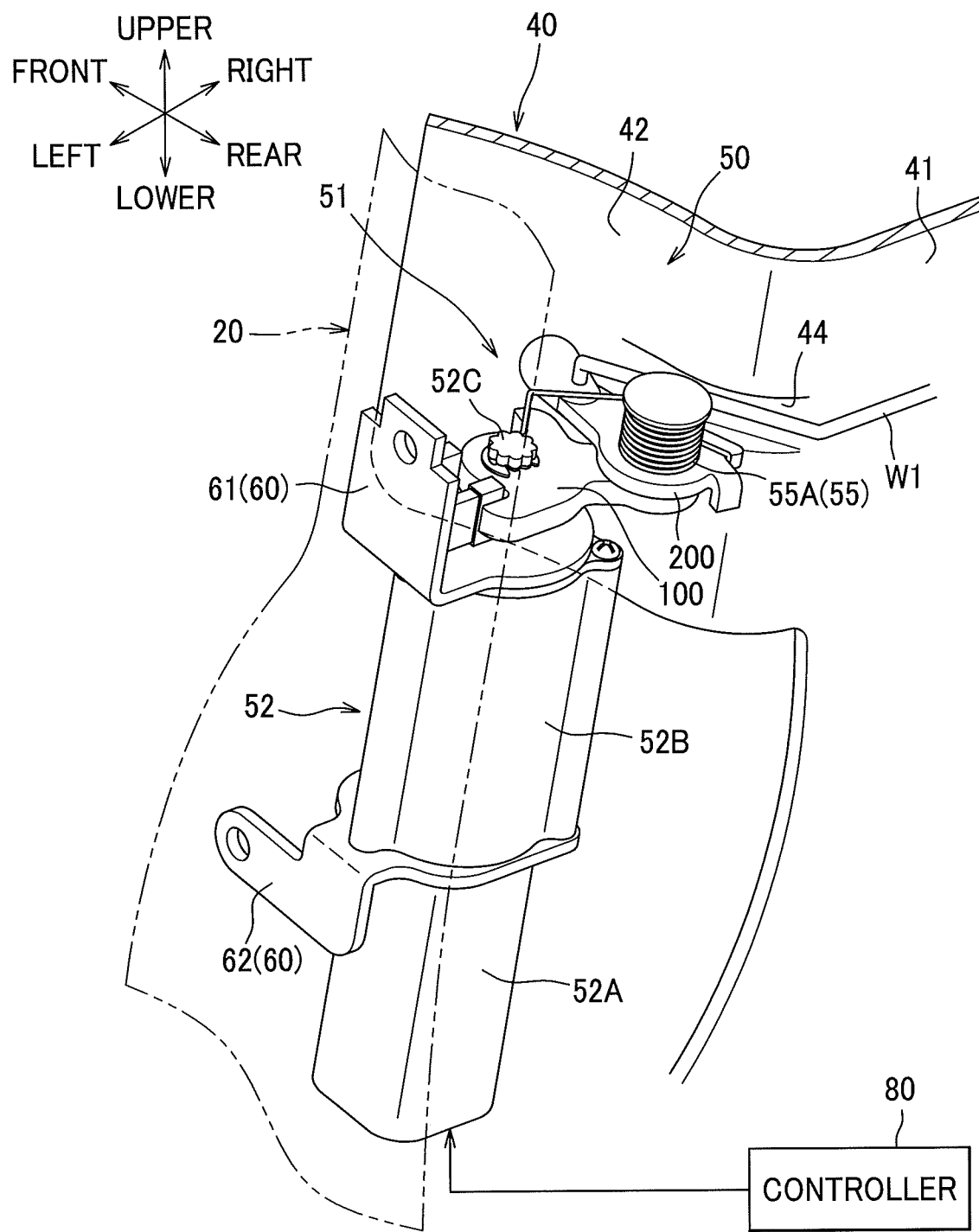
FIG. 5 is a perspective view of a driving mechanism as viewed from the rear side.

As seen in FIG. 5, the driving mechanism 50 mainly includes a linkage 51 connected to the pressure-receiving member 40 via the upper connecting wire W1, and a driving source 52 configured to actuate the linkage 51. The right and left driving mechanisms 50 are substantially symmetrical in structure, and the left-side driving mechanism 50 will be mainly explained in detail in the following description with reference to the drawings.

Figure 6:
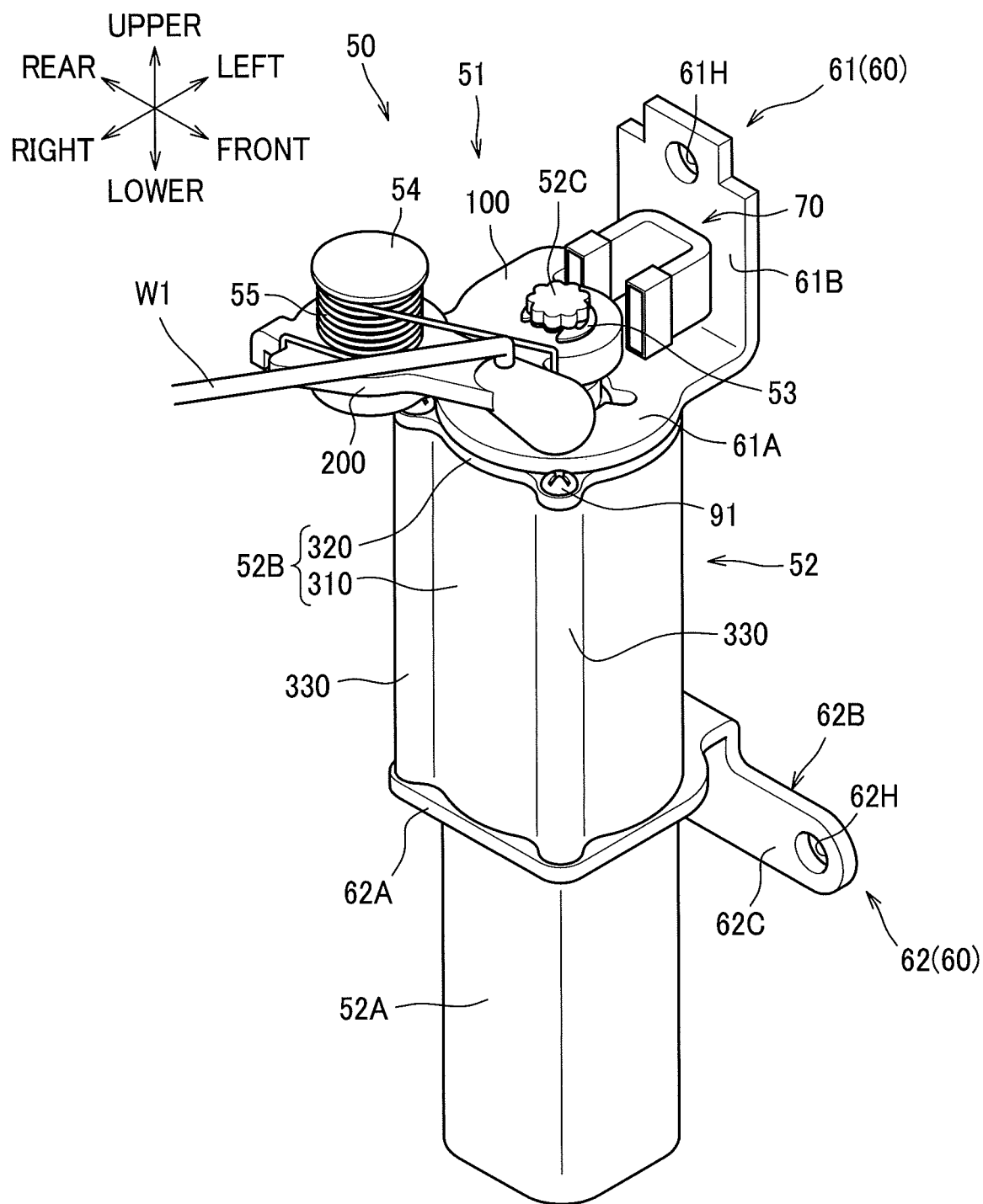
FIG. 6 is a perspective view of the driving mechanism as viewed from the front side.
Figure 7:
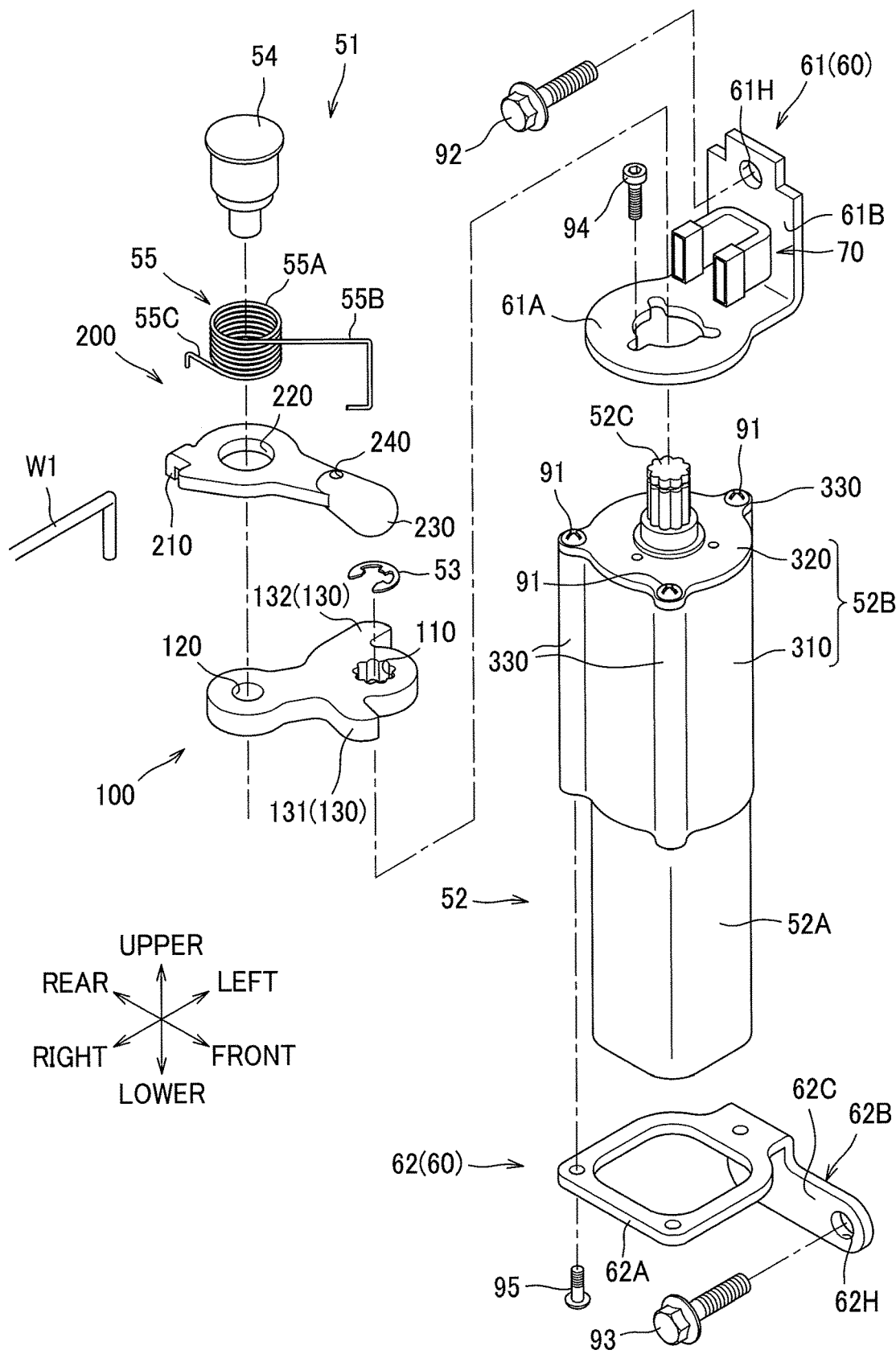
FIG. 7 is an exploded perspective view of the driving mechanism.

As seen in FIGS. 6 and 7, the driving source 52 mainly includes a motor 52A, a gearbox 52B, and an output shaft 52C; the driving source 52 is fixed to the side frame 20 via a bracket 60. The driving source 52 is disposed in such a position as not to get in contact with the pressure-receiving member 40.

The motor 52A is configured such that widths thereof in the lateral direction as well as in the front-rear direction are smaller than those of the gearbox 52B that is disposed on an upper portion of the motor 52A. Namely, the driving source 52 is narrower at its lower portion (motor 52A) than at its upper portion (gearbox 52B).

The gearbox 52B is a member for accommodating a train of gears (not shown) configured to reduce a speed with which a rotary driving force generated by the motor 52A is transmitted therethrough, and mainly includes a box body 310 approximately in the shape of a tube, and a lid member 320 configured to close an upper end portion (at an end portion in the axial direction of the output shaft 52C) of the box body 310. Provided at side surfaces of the box body 310 and the lid member 320 are three fastening portions 330 each protruding radially outward of the output shaft 52C. The fastening portion 330 is a portion in which a screw 91 as an example of a fastening member for fastening the box body 310 and the lid member 320 is disposed. The fastening portions 330 are arranged on the side surface of the gearbox 52B at equally-spaced intervals in a circumferential direction of the gearbox 52B.

The output shaft 52C is a shaft for outputting the rotary driving force of the motor 52A, the speed of which has been reduced by the gearbox 52B. The output shaft 52C is disposed through the lid member 320.

The structure of the bracket 60 by which the driving source 52 (driving mechanism 50) is fixed to the side frame 20 will be described.

The bracket 60 consists of a first bracket 61 and a second bracket 62. Each of the first bracket 61 and the second bracket 62 is made by press working sheet metal to have an approximately L-shaped cross section, and mainly includes an engagement portion 61A, 62A and a fixing portion 61B, 62B.

The engagement portion 61A of the first bracket 61 is a portion engaged with an upper end portion (lid member 320) of the gearbox 52B that is a portion of the driving source 52 located at one end in the axial direction thereof; the engagement portion 61A is approximately in the shape of a circular disk having an engagement hole. The fixing portion 61B is a portion fixed to the side frame 20, and extends along the side frame 20 from a laterally outer end portion (end portion located near the side frame 20) of the engagement portion 61A toward an upper side opposite to a lower side on which a portion of the driving source 52 located at the other end in the axial direction thereof (opposite to the one end) is located. The fixing portion 61B has a circular hole 61H through which a bolt 92 for fixing the first bracket 61 to the side frame 20 is inserted.

The engagement portion 62A of the second bracket 62 is a portion engaged with the motor 52A of the driving source 52, and is approximately in the shape of a frame. The fixing portion 62B is a portion fixed to the side frame 20, and extends downward along the side frame 20 from a laterally outer end portion of the engagement portion 62A. As seen in FIG. 8 (*a*), the fixing portion 62B has an extension portion 62C extending frontward (in a direction orthogonal to the axial direction) farther than the driving source 52 when viewing the side frame 20 laterally from the inner side. The extension portion 62C has a circular hole 62H (see FIG. 7) through which a bolt 93 for fixing the second bracket 62 to the side frame 20 is inserted.

As seen in FIG. 7, the first bracket 61 is fixed to the driving source 52 with the engagement portion 61A being engaged with the upper end portion of the gearbox 52B and fastened to the gearbox 52B by three bolts 94 (only one of them is shown in the figure), whereas the second bracket 62 is fixed to the driving source 52 with the engagement portion 62A being engaged with the motor 52A and fastened to the gearbox 52B by three screws 95 (only one of them is shown in the figure). Further, as seen in FIG. 8 (*a*), the driving source 52 is fixed to the side frame 20 with the fixing portion 61B being fixed to the side frame 20 by a bolt 92 and with the fixing portion 62B being fixed at its extension portion 62C to the side frame 20 by a bolt 93.

In this embodiment, when viewing the side frame 20 shown in FIG. 8 (*a*) from a side where the driving source 52 is fixed to the side frame 20, the fixing portion 61B and the extension portion 62C do not overlap the driving source 52 (extend outward beyond the driving source 52), so that the bracket 60 can be easily attached to the side frame 20 by the bolts 92, 93. Accordingly, the driving source 52 can be easily fixed to the side frame 20. Further, the driving source 52 can be stably fixed to the side frame 20 by means of the two brackets, i.e., the first bracket 61 and the second bracket 62.

The extension portion 62C has a front end portion disposed on the bulging portion 22 of the side frame 20. This configuration makes it unnecessary to provide the side frame 20 with a dedicated portion on which the extension portion 62C extending frontward beyond the driving source 52 is disposed, so that the structure of the side frame 20 can be simplified and a compact structure can be provided around the driving source 52.

As seen in FIG. 8 (*b*), the driving source 52 fixed to the side frame 20 via the bracket 60 is located such that as viewed from an axial direction of the output shaft 52C, all the three fastening portions 330 are arranged at positions avoiding a line LN (shown by the alternate long and short dash line) connecting the ends of the pair of bent portions 21A of the side frame 20. To be more specific, as viewed from the axial direction, the fastening portions 330 are provided such that at least one fastening portion 330 is arranged on each side of the line LN, and more specifically, one at a laterally outer side of the line LN and two at a laterally inner side of the line LN.

The first bracket 61 (engagement portion 61A) has a size such that as viewed from the axial direction, the laterally inner end 61E thereof does not protrude laterally inward from the laterally inner end 52E of the driving source 52. With this configuration, the first bracket 61 does not protrude on an occupant's side, so that a compact structure can be provided around the driving source 52.

As shown in FIG. 7, the linkage 51 is rotatable substantially in the front-rear direction relative to the side frame 20, and mainly includes two links for actuating the pressure-receiving member 40, more specifically, a drive link member 100 as an example of a second link member and a contact link member 200 as an example of a link member.

The drive link member 100 is a member made of metal and in the shape of a long plate, and mainly includes a shaft hole 110 formed in one end portion thereof, a pin-insertion hole 120 formed in the other end portion thereof, and a stopper portion 130. The drive link member 100 is fastened to the driving source 52 with the shaft hole 110 being connected to (e.g., serration-fitted onto) the output shaft 52C of the driving source 52 and the output shaft 52C being clipped by an E-ring 53 to prevent the drive link member 100 from coming off the output shaft 52C. With this configuration, the drive link member 100 rotates substantially in the front-rear direction when the driving source 52 is driven.

The stopper portion 130 is a portion configured to contact a member fixed to the side frame 20, specifically a fixed stopper member 70 to be described later, to restrict a rotation of the drive link member 100 itself. To be more specific, the stopper portion 130 includes a first stopper portion 131 configured to restrict a rotation of the drive link member 100 in a forward direction (in one direction) and a second stopper portion 132 configured to restrict a rotation of the drive link member 100 in a rearward direction (in a direction opposite to the one direction).

Figure 9:
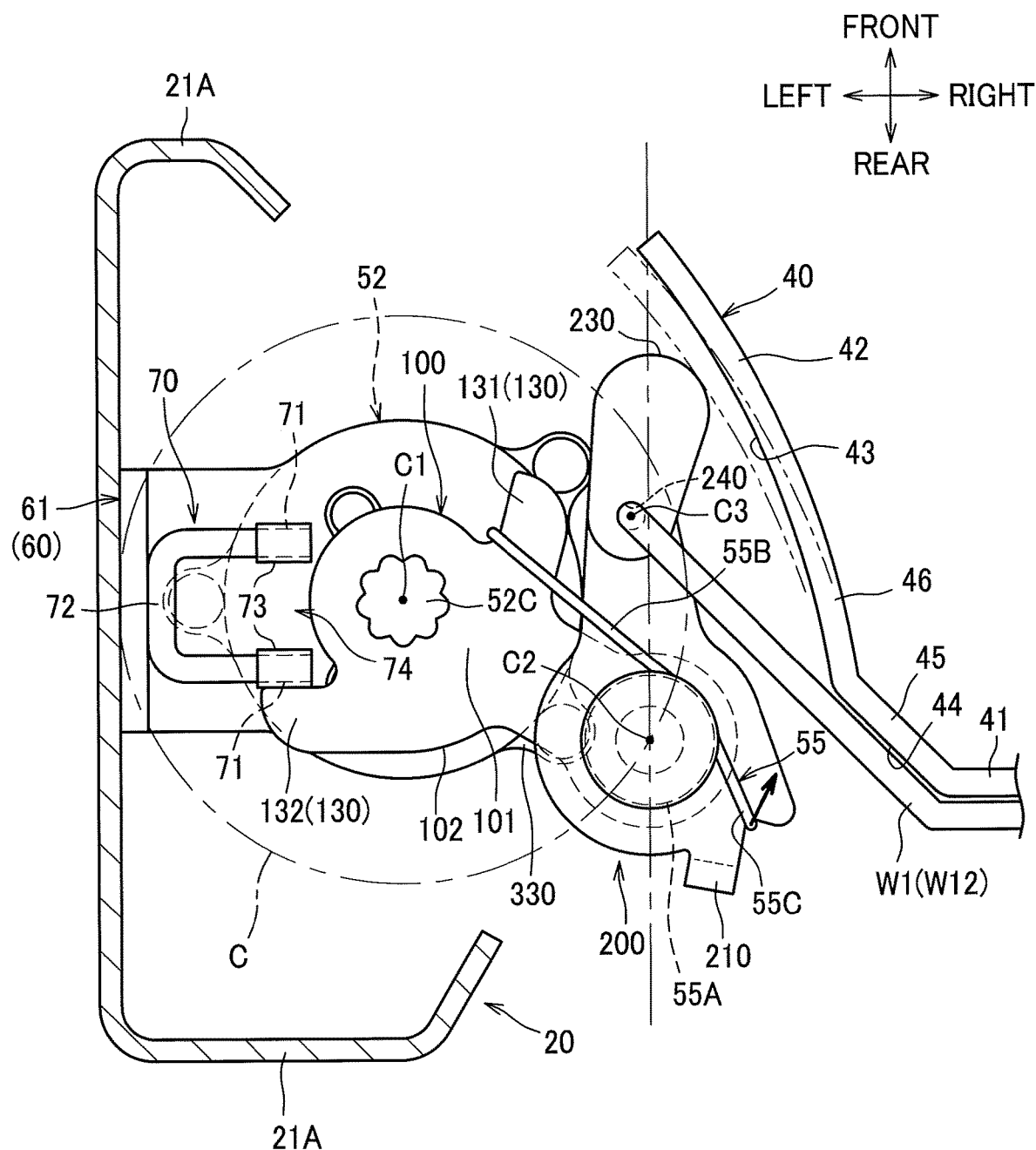
FIG. 9 is an enlarged top view of the driving mechanism.

As seen in FIG. 9, the first stopper portion 131 and the second stopper portion 132 are provided, as viewed from a direction of the axis of rotation of the drive link member 100 (axial direction of the output shaft 52C), at an outer peripheral portion of the drive link member 100, in other words, at a contour portion of the drive link member 100. Furthermore, the first stopper portion 131 and the second stopper portion 132 are provided on a side surface 102 which surrounds the output shaft 52C that is an axis of rotation of the drive link member 100. To be more specific, the first stopper portion 131 protrudes substantially frontward from the front side of the long main body portion 101 when the drive link member 100 takes a posture shown in FIG. 9 (i.e., when the pressure-receiving member 40 is in an initial position); that surface of the first stopper portion 131 which contacts the fixed stopper member 70 is substantially flat. Further, in this posture of the drive link member 100, the second stopper portion 132 protrudes substantially leftward from the rear side of the main body portion 101; that surface of the second stopper portion 132 which contacts the fixed stopper member 70 is substantially flat.

The structure of the fixed stopper member 70 will be described.

The fixed stopper member 70 is a member for restricting a rotation of the drive link member 100 by the stopper portion 130 coming into contact with the fixed stopper member 70; the fixed stopper member 70 is fixed to the side frame 20. To be more specific, the fixed stopper member 70 is disposed between the output shaft 52C and the side frame 20; as viewed form the axial direction of the output shaft 52C, the fixed stopper member 70 has the shape of the letter U opening toward the laterally inner side that is a side where the drive link member 100 is disposed. The fixed stopper member 70 is fixed to the side frame 20 via the first bracket 61 with a proximal portion 72 of the fixed stopper member 70 (that is located opposite to end portions 71 of the letter U) being fixed to the first bracket 61 by welding or the like.

The fixed stopper member 70 has a rotation-restricting portion 73 at each of its end portions 71 such that the stopper portion of the drive link member 100 can come into contact with the rotation-restricting portions 73. Each rotation-restricting portion 73 is approximately in the shape of a rectangular tube and engageable onto the end portion 71; the rotation-restricting portion 73 is made of plastic resin. The drive link member 100 is configured such that a frontward rotation thereof (i.e., rotation of the drive link member 100 toward the front side) is restricted with the first stopper portion 131 coming into contact with the front-side rotation-restricting portion 73 (see FIG. 11 (c)), whereas a rearward rotation thereof (i.e., rotation of the drive link member 100 toward the rear side) is restricted with the second stopper 132 coming into contact with the rear-side rotation-restricting portion 73. Since the rotation-restricting portions 73 are made of plastic resin, contact noise generated between the stopper portion 130 and the fixed stopper member 70 can be suppressed, so that noise produced by the actuation of the drive link member 100 can be suppressed.

Further, as viewed from the axial direction of the output shaft 52C, each of the rotation-restricting portions 73 is located within a generally circular-shaped contour of the driving source 52. This makes it possible to suppress upsizing of the drive link member 100 having the side surface 102 on which is provided the stopper portion 130 contactable with the rotation-restricting portions 73, so that a compact structure of the drive link member 100 can be provided.

As viewed from the axial direction, the output shaft 52C is so disposed as to face an opening 74 of the U-shaped fixed stopper member 70. This makes it possible to arrange the drive link member 100 and the fixed stopper member 70 laterally adjacent to each other, so that a compact structure can be provided around the drive link member 100.

Further, as viewed from the axial direction of the output shaft 52C, the stopper portion 130 is disposed inside a circle C (shown by the alternate long and short dash line); the circle C is defined such that the center of the circle C coincides with the rotation center C1 of the drive link member 100 and the radius of the circle C corresponds to the distance from the rotation center C1 to the rotation center C2 of the contact link member 200. With this configuration, upsizing of the drive link member 100 can be suppressed and a compact structure of the drive link member 100 can be provided.

In this embodiment, the right and left drive link members 100 are each provided using a common part. To be more specific, the drive link member 100 constituting the left-side driving mechanism 50 shown in FIG. 9 can be used as the right-side driving mechanism 50 by reversing it or placing the reverse side obverse. This configuration is achieved because the stopper portion 130 is provided on the side surface 102 of the plate-like drive link member 100 but does not protrude only in one side in the axial direction. Using the common part makes it possible to reduce the number of parts and to save the effort of parts management, so that reduction in the cost can be achieved. Further, the mix-up between the right and left parts can be prevented and the assembling is facilitated.

As seen in FIG. 7, the contact link member 200 is a member in the shape of a long plate, and mainly includes a stopper 210 and a pin-insertion hole 220 formed in one end portion thereof, a contact portion 230 provided on the other end portion thereof, and a through-hole 240 formed in a region between the pin-insertion hole 220 and the contact portion 230. The contact link member 200 rotates substantially in the front-rear direction relative to the drive link member 100 with the pin 54 being engaged into the pin-insertion hole 220 and the pin-insertion hole 120 of the drive link member 100. Further, the contact link member 200 is connected to the pressure-receiving member 40 via the upper connecting wire W1 with an end portion of the upper connecting wire W1 being inserted into the through-hole 240.

Figure 10:
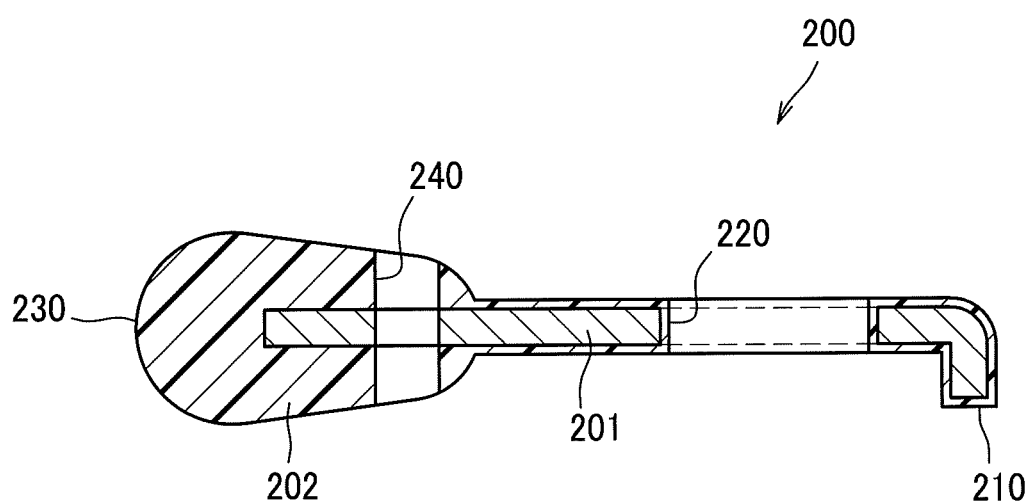
FIG. 10 is a sectional view of a contact link member.

The contact portion 230 is a portion configured to contact the pressure-receiving member 40 when the driving source 52 actuates the pressure-receiving member 40. As seen in FIG. 9, the contact portion 230 has a convexly curved shape as viewed from a direction of the axis of rotation of the contact link member 200. Further, as seen in FIG. 10, the contact portion 230 also has a convexly curved shape as viewed from any direction orthogonal to the direction of the axis of rotation. To be more specific, the contact portion 230 is approximately spherical in shape.

When the pressure-receiving member 40 is in the initial position (as shown by the solid line in FIG. 9) and a load is not input from an occupant to the pressure-receiving member 40 (i.e., when an occupant is not seated on the car seat S), the pressure-receiving member 40 is spaced apart from the contact portion 230. When an occupant sits on the car seat S and a load is input from the occupant to the pressure-receiving member 40 in the initial position, the support portion 42 deforms as shown by the chain double-dashed line and contacts the contact portion 230. With this configuration, since deformation or movement of the pressure-receiving member 40 is allowed until the pressure-receiving member 40 comes into contact with the contact portion 230, the cushionability of the seat back S2 can be improved. The pressure-receiving member 40 has a contact surface 43, with which the contact portion 230 comes into contact, at the rear surface of the support portion 42. As viewed from the direction of the axis of rotation of the contact link member 200, the contact surface 43 has a concavely curved shape.

Further, because of the provision of the relief portion 44, the support portion 42 has, at the same height position as the height of the position of the upper connecting wire W1, a first support portion 45 extending in a diagonally leftward and frontward direction from the pressure-receiving portion 41, and a second support portion 46 extending further in a diagonally leftward and frontward direction from a laterally outward end portion of the first support portion 45. The contact surface 43 is provided on the second support portion 46. The upper connecting wire W1 is bent at a portion corresponding to a boundary between the pressure-receiving portion 41 and the first support portion 45, and contiguously in contact with the pressure-receiving portion 41 and the first support portion 45.

The contact portion 230 of the contact link member 200 is provided, as seen in FIGS. 12 (a) and (b), so as to contact the contact surface 43 of the pressure-receiving member 40 at a position laterally outward of the tuck-in groove BP3 of the seat back pad BP. The seat back pad BP is thinner at a potion where the tuck-in groove BP3 is formed, and is easily deformable at this thinner portion. With this configuration, when the contact portion 230 pushes the support portion 42 of the pressure-receiving member 40 forward, the side pad portion BP2 of the seat back pad BP can be pushed forward with a small force.

Retuning to FIG. 9, the stopper 210 is a portion configured to contact the side surface 102 of the drive link member 100 to restrict the amount of rearward rotation of the contact link member 200 (see FIG. 11 (c) and FIG. 15 (c)). The stopper 210 protrudes out from one end portion of the contact link member 200 and is bent downward at the distal end of this protruding portion toward the lower side where the drive link member 100 is disposed.

As seen in FIG. 10, the contact link member 200 includes a link body 201 having the shape of a long plate, and a cover member 202 entirely covering the link body 201. The link body 201 and the cover member 202 are made of different materials. To be more specific, the contact link member 200 is made by insert molding or the like; the link body 201 is made of metal and the cover member 202 is made of plastic resin. The through-hole 240 is formed through the link body 201 and the cover member 202. The contact portion 230 is provided on the cover member 202 and formed as a part of the cover member 202. Accordingly, the contact portion 230 is made of plastic resin.

As seen in FIG. 9, the contact link member 200 is formed such that the length from the rotation center C2 thereof to the contact portion 230 is longer than the length from the rotation center C2 to the rotation center C1 of the drive link member 100.

As seen in FIGS. 6 and 7, a torsion spring 55 as an urging member is disposed between (in terms of its mechanics between) the drive link member 100 and the contact link member 200. The torsion spring 55 is a member configured to urge the contact link member 200 to rotate frontward (in one direction), and includes a coil portion 55A disposed on the contact link member 200 (i.e., on the opposite side of the contact link member 200 from the driving source 52, a first arm portion 55B extending radially outward from an upper end of the coil portion 55A and bent downward at its distal end to provide an approximately L-shaped configuration, and a second arm portion 55C extending radially outward from a lower end of the coil portion 55A and bent downward at its distal end to provide an L-shaped configuration.

The torsion spring 55 is positioned with the coil portion 55A thereof being engaged by the pin 54, with the first arm portion 55B as one end of the torsion spring 55 being hooked onto the first stopper portion 131 of the drive link member 100, and with the second arm portion 55C as the other end of the torsion spring 55 being hooked onto the stopper 210 of the contact link member 200. With this configuration, the torsion spring 55 generates an urging force to rotate the contact link member 200 in a direction shown by the arrow in FIG. 9.

The torsion spring 55 and the upper connecting wire W1 as an example of a connecting wire serve as a member for restricting a rearward rotation of the contact link member 200, in other words, a member (rotation resistive member) to provide resistance against the rearward rotation. To be more specific, the torsion spring 55 urges the contact link member 200 to rotate frontward, to thereby restrict a rearward rotation of the contact link member 200.

Further, the upper connecting wire W1 has right and left end portions, both of which are bent diagonally frontward, and a downwardly extending end portion of each end portion is coupled into the through-opening 240 of the contact link member 200, so that the upper connecting wire W1 connects the pressure-receiving member 40 and the contact link member 200. Further, a connecting portion C3 connecting the contact link member 200 and the pressure-receiving member 40 is located, when the pressure-receiving member 40 is in the initial position shown in FIG. 9, at a front end portion of the contact link member 200, more specifically, at a position frontward of the rotation center C2 of the contact link member 200, so that the upper connecting wire W1 urges the contact link member 200 to rotate frontward; this can restrict a rearward rotation of the contact link member 200.

The coil portion 55A of the torsion spring 55 is so located as to face the relief portion 44 of the pressure-receiving member 40 (see FIG. 5). This configuration suppresses a noise which would occur when the pressure-receiving member 40 deforms, and can serve to make effective use of the space.

As viewed along the upper-lower direction, the coil portion 55A of the torsion spring 55 overlaps part of the driving source 52, more specifically, the fastening portion 330. This makes it possible to downsize the driving mechanism 50 in the horizontal direction. Further, the coil portion 55A is spaced apart from the upper connecting wire W1. This arrangement can reduce the possibility of undesired engagement of the upper connecting wire W1 with the coil portion 55A when the upper connecting wire moves backward.

When the pressure-receiving member 40 is in the initial position as shown in FIG. 9, the connecting portion C3 is located inside the circle C shown by the alternate long and short dash line, as viewed from the direction of the axis of rotation of the contact link member 200. Further, the connecting portion C3 is located laterally outward of the rotation center C2 of the contact link member 200 when the pressure-receiving member 40 is in the initial position.

The driving mechanisms 50 configured as described above are independently operable at the right-side and at the left-side. To be more specific, the driving sources 52 are controlled by the controller 80 so that the right-side driving source 52 and the loft-side driving source 52 are independently driven, and the drive link member 100 and the contact link member 200 of the right-side linkage 51 and the drive link member 100 and the contact link member 200 of the left-side linkage 51 are independently rotatable. Namely, the driving mechanisms 50 are not configured such that, for example, when the left-side drive link member 100 and the left-side contact link member 200 rotate, the right-side drive link member 100 and the right-side contact link member 200 rotate in an interlocking manner.

As seen in FIG. 5, the controller 80 is configured to control the actuation of each driving source 52 (motor 52A) so that the pressure-receiving member 40 disposed in the seat back S2 is oriented toward a turning direction (see FIG. 13). Although various control methods are available with the controller 80, as an example, lateral acceleration and turning direction may be obtained based on signals from wheel speed sensors and a steering angle sensor, and if the thus obtained lateral acceleration exceeds a predetermined threshold value, then the motor 52A of the driving mechanism 50 located at the outer side in the turning direction is driven, to thereby orient the pressure-receiving member 40 toward the turning direction.

In this embodiment, the controller 80 monitors electric current flowing through the motor 52A during the operation of the motor 52A, and stops the supply of electric current to the motor 52A to stop the operation of the motor 52A. When the drive link member 100 rotates until the stopper portion 130 contacts the fixed stopper member 70, the motor 52A stops and the electric current flowing through the motor 52A becomes large. The controller 80 detects this condition and stops the supply of electric current to the motor 52A. This configuration makes it possible with a simple structure to cause the stopper portion 130 to appropriately work as well as to precisely regulate the amount of rotation of the drive link member 100.

Next, operations of the driving mechanism 50 and the pressure-receiving member 40 during cornering of the car will be described.

When the car turns to the right, the controller 80 actuates the driving source 52 of the left-side driving mechanism 50. This causes the drive link member 100 to rotate frontward from the posture shown in FIG. 11 (*a*) to the postures shown in FIGS. 11 (*b*) and (*c*), so that the contact link member 200 moves frontward while rotating relative to the drive link member 100. Accordingly, the left end portion (connecting portion C3) of the upper connecting wire W1 moves frontward to thereby cause the left-side support portion 42 (left end portion) of the pressure-receiving member 40 to move from the initial position to the advanced position that is located frontward of the initial position.

The first stopper portion 131 of the drive link member 100 then comes into contact with the front-side rotation-restricting portion 73 of the fixed stopper member 70, so that the rotation of the drive link member 100 is restricted, and the stopper 210 of the contact link member 200 comes into contact with the side surface 102 of the drive link member 100, so that the rotation of the contact link member 200 is restricted. In so doing, the electric current flowing through the driving source 52 exceeds the predetermined value, and the controller 80 stops the operation of the driving source 52.

Accordingly, as seen in FIGS. 12 (*a*), (*b*) and 13, the left end portion of the pressure-receiving member 40 moves from the initial position to the advanced position, so that the entire pressure-receiving member 40 is oriented to the turning direction, i.e., to the right-side. As a result, the centrifugal force applied to the occupant during cornering can be appropriately supported by the seat back S2.

To be more specific, as seen in FIG. 3, when the support portion 42 of the pressure-receiving member 40 moves from the initial position to the advanced position, the lower portion of the pressure-receiving portion 41, that is, the first portion 40A does not move in the front-rear direction because the first portion 40A is supported by the lower connecting wire W2 that is fixed to the side frames 20 (and does not move at least by the operation of the driving mechanism 50). This causes the pressure-receiving member 40 to get twisted at the third portion 40C that is located between the first portion 40A and the second portion 40B having the support portions 42. In this embodiment, since the lateral width of the third portion 40C is smaller than that of the first portion 40A and that of the second portion 40B, the pressure-receiving member 40 easily gets twisted at the third portion 40C. With this configuration, the support portions 42 can move smoothly between the initial position and the advanced position.

It is to be noted that since the first bead B1 is provided on the third portion 40C, a plastic deformation of the pressure-receiving member 40 can be suppressed when it is twisted; further, the first bead B1 extends in the upper-lower direction, which does not prevent the pressure-receiving member 40 from being twisted at the third portion 40C.

Further, the first portion 40A and the second portion 40B are connected at the third portion 40C, so that an uncomfortable feeling experienced by the occupant when the support portions 42 move can be suppressed, as compared with an alternative configuration in which the first portion 40A and the second portion 40B are not connected.

In this embodiment, since the linkage 51 consists of the drive link member 100 and the contact link member 200, when comparing with an alternative configuration in which the upper connecting wire W1 is directly connected to one link member (e.g., drive link member 100 shown in FIG. 11) to move the pressure-receiving member 40 in the front-rear direction, a long travel distance of the left end portion of the upper connecting wire W1 in the front-rear direction can be ensured. This makes it possible to ensure a sufficient travel distance (amount of inclination) of the pressure-receiving member 40, so that the centrifugal force applied to the occupant during cornering can be favorably supported by the pressure-receiving member 40.

Further, in this embodiment, when the pressure-receiving member 40 is in the initial position, the connecting portion C3 is located laterally outward of the rotation center C2 and the contact link member 200 is urged to rotate frontward by the upper connecting wire W1 and other parts, so that the contact link member 200 is unlikely to rotate rearward. This configuration can prevent the distal end of the contact link member 200 from unsteadily moving when the pressure-receiving member 40 is moved from the initial position to the advanced position, so that a stable movement of the pressure-receiving member 40 can be ensured.

In this embodiment, as seen in FIG. 11 (*c*), the contact link member 200 in the advanced position takes a posture such that the laterally outer end portion 231 of the contact portion 230 is located laterally outward of the lateral end 49 of the support portion 42 of the pressure-receiving member 40. With this arrangement, the contact link member 200 supports the end portion of the support portion 42 of the pressure-receiving member 40, so that the pressure-receiving member 40 can be stably supported by the contact link member 200.

Further, in the advanced position, the connecting portion C3 connecting the contact link member 200 and the upper connecting wire W1 is located laterally outward of a first imaginary line L1 connecting the contact point P of the contact portion 230 and the pressure-receiving member 40 and the rotation center C2 of the contact link member 200. With this arrangement, the contact link member 200 can support the pressure-receiving member 40 at a position as laterally outward as possible, so that the pressure-receiving member 40 can be stably supported by the contact link member 200.

Further, in the advanced position, the rotation center C2 of the contact link member 200 is located laterally inward of a second imaginary line L2 connecting the contact point P of the contact portion 230 and the pressure-receiving member 40 and the shaft center C4 (rotation center of the drive link member 100) of the driving source 52. This arrangement can suppress an excessive rotation of the contact link member 200 in the clockwise direction of FIG. 11 when a load is applied in the advanced position from the occupant to the left-side support portion 42 of the pressure-receiving member 40.

In this embodiment, as seen in FIG. 13, the contact link member 200 rotates to such an extent that in the advanced position, the contact point P of the contact link member 200 and the pressure-receiving member 40 is located frontward farther than the front end of the side frame 20. With this configuration, sufficient amount of frontward displacement of the contact link member 200 can be ensured.

As seen in FIGS. 12 and 13, the driving mechanism 50 is disposed in a space of the seat back pad BP formed between the pressure-receiving member 40 and the side frame 20 and is configured such that the contact link member 200 does not contact the seat back pad BP even when the contact link member 200 rotates. This configuration can suppress abnormal noise which would occur when the contact link member 200 contacts the seat back pad BP.

Further, as seen in FIG. 14, the seat back pad BP is thinner at a potion where the pair of second tuck-in grooves BP4 are formed and thus a portion between the pair of second tuck-in grooves BP4 is easily caused to sag. The support portions 42 of the pressure-receiving member 40 and the upper connecting wire W1 are provided at the same height as that of the portion between the pair of second tuck-in grooves BP4, so that when the support portions 42 and the upper connecting wire W1 are moved, the seat back pad BP is easily deformable in accordance with the movements thereof.

When the car is to be shifted from turning state to straight travelling state, the controller 80 drives the driving source 52 of the left-side driving mechanism 50 to rotate in a direction reverse to that in which it rotates in the turning state. This causes the drive link member 100 to rotate rearward from the posture shown in FIG. 11 (c) to the postures shown in FIGS. 11 (b) and (a). The contact link member 200 then moves rearward while rotating relative to the drive link member 100 by the load applied from the occupant to the pressure-receiving member 40. This causes the left end portion of the upper connecting wire W1 to move rearward, and the left-side support portion 42 of the pressure-receiving member 40 is moved from the advanced position to the initial position.

Further, the second stopper portion 132 of the drive link member 100 comes into contact with the rear-side rotation-restricting portion 73 of the fixed stopper member 70, so that the rotation of the drive link member 100 is restricted. In so doing, the electric current flowing through the driving source 52 exceeds the predetermined value, and the controller 80 stops the operation of the driving source 52. Accordingly, the pressure-receiving member 40 returns from the posture shown in FIG. 13, in which the pressure-receiving member 40 is oriented to the right, to the posture shown in FIG. 12 (a), in which the pressure-receiving member 40 faces the front.

On the other hand, when the car turns to the left, the controller 80 actuates the driving source 52 of the right-side driving mechanism 50. The subsequent operations of the pressure-receiving member 40 and the right-side driving mechanism 50 are similar to those in the right turn, and therefore detailed description thereof will be omitted.

In this embodiment, the pressure-receiving member 40 is configured such that when an occupant sits on the car seat S and the pressure-receiving member 40 contacts the contact portion 230 of the contact link member 200, the contact surface 43 keeps on contacting the contact portion 230 in the whole rotation range of the contact link member 200. With this configuration, the rotation of the contact link member 200 is guided, in a sense, by the pressure-receiving member 40, so that the contact link member 200 can be operated smoothly.

Further, in this embodiment, since the contact portion 230 and the pressure-receiving member 40 are made of plastic resin, rubbing noise generated between the contact link member 200 and the pressure-receiving member 40 and the abrasion thereof can be suppressed. Further, since the contact surface 43 has a concavely curved shape and the contact pressure between the contact portion 230 and the contact surface 43 is lessened, abrasion of the contact link member 200 and the pressure-receiving member 40 can be further suppressed.

Next, operations of the driving mechanism 50 and the pressure-receiving member 40 in a rear-end collision will be described. Herein, the term "in the rear-end collision" indicates an occasion when the car is rear-ended by another car or when the car collides at the rear portion thereof with another car or a structural object while reversing.

As seen in FIG. 15 (a), in a normal condition in which the pressure-receiving member 40 is in the initial position without occurrence of a rear-end collision (i.e., when a load smaller than the predetermined amount has been input from an occupant to the pressure-receiving member 40), a rearward rotation of the contact link member 200 is restricted by the upper connecting wire W1 and the like, so that the pressure-receiving member 40 does not move rearward so much from the initial position.

On the other hand, when a rear-end collision occurs and a load equal to or greater than the predetermined amount is input from the occupant to the pressure-receiving member 40, this large load causes the pressure-receiving member 40 to move backward, so that the end portions of the upper connecting wire W1 pull the contact link members 200 (connecting portions C3) backward. In so doing, as seen in FIG. 15 (b), the contact link members 200 move rearward while causing the upper connecting wire W1 and the pressure-receiving member 40 to elastically deform laterally inward, so that the pressure-receiving member 40 moves further backward from the initial position to the backward position shown in FIG. 15 (c). When the pressure-receiving member 40 moves to the backward position, the stopper 210 of the contact link member 200 comes into contact with the side surface 102 of the drive link member 100, so that the rotation of the contact link member 200 is restricted and the backward movement of the pressure-receiving member 40 is restricted as well.

As seen in FIGS. 16 (a) to (c), when the pressure-receiving member 40 moves from the initial position to the backward position, the upper body of the occupant sinks into the seat back S2. This makes it possible to allow the head of the occupant to quickly approach the headrest S3 and to be received by the headrest S3, so that an impact imparted to the neck of the occupant in the rear-end collision can be reduced.

In this embodiment, since the contact link member 200 includes the stopper 210, an excessive rearward rotation of the contact link member 200 can be prevented. This configuration makes it possible, for example, to adjust the amount of sinking of an occupant into the seat back S2 and to easily return the pressure-receiving member 40 once located in the backward position to the initial position.

As seen in FIG. 15 (c), the connecting portion C3 is located rearward of the rotation center C2 of the contact link member 200 when the pressure-receiving member 40 is in the backward position. In this position, the upper connecting wire W1 functions as an urging member for urging the contact link member 200 in the direction shown by the arrow, more specifically, an urging member (second urging member) configured to urge the contact link member 200 to rotate rearward. With this configuration, the pressure-receiving member 40 having been moved into the backward position due to the rear-end collision can be held in the backward position, which can suppress undesired forward displacement of the pressure-receiving member 40 in reaction to the rearward movement thereof.

Further, in this embodiment, the pressure-receiving member 40 does not contact the driving source 52 while moving from the initial position to the backward position and from the initial position to the advanced position. This configuration can suppress abnormal noise generated by the movement of the pressure-receiving member 40.

According to the car seat S configured as described above, the driving mechanism 50 can provide a function of appropriately supporting an occupant by changing the orientation of the pressure-receiving member 40 during cornering as well as a function of reducing an impact imparted to the occupant by moving the pressure-receiving member 40 to the backward position in a rear-end collision. This makes it unnecessary to provide within the seat back S2 both the mechanism for changing the orientation of the pressure-receiving member and the mechanism for allowing a rearward movement of the pressure-receiving member, so that space within the seat back S2 is ensured to arrange other mechanisms or the car seat S can be downsized; it is therefore possible to improve the degree of freedom in the design of the car seat S.

Further, providing the upper connecting wire W1 and the torsion spring 55 as an example of a rotation resistive member resisting a rearward rotation of the contact link member 200 can suppress undesired rearward displacement of the pressure-receiving member 40 in the normal condition.

Further, since the connecting portion C3 is located inside the circle C when the pressure-receiving member 40 is in the initial position, the amount of deformation of the upper connecting wire W1 caused when the pressure-receiving member 40 moves into the backward position can be reduced and upsizing of the upper-connecting wire W1 can be suppressed.

The distal end of the contact link member 200 has the contact portion 230 having a convexly curved shape as viewed from a direction of its axis of rotation. This configuration makes it possible to lessen the sliding resistance between the contact portion 230 and the pressure-receiving member in the rotating direction of the contact link member 200, so that the contact link member 200 and the pressure-receiving member 40 can be moved smoothly during cornering or in a rear-end collision. Further, the contact portion 230 has a convexly curved shape also as viewed from a direction orthogonal to the direction of the axis of rotation. This configuration makes it possible to lessen the sliding resistance also in the direction of the axis of rotation of the contact link member 200, so that for example, when the pressure-receiving member 40 moves upward or downward, the pressure-receiving member 40 and the like can be moved smoothly. Furthermore, the contact portion 230 has a generally spherical shape, so that the sliding resistance can be lessen in all directions thereof and when the contact link member 200 and the pressure-receiving member 40 are operated to contact together, the contact link member 200 and the like can be moved smoothly.

The upper connecting wire W1 is inserted into the through-hole 240 and connected to the contact link member 200, so that the contact link member 200 and the upper connecting wire W1 can easily be connected together.

As seen in FIG. 11, the drive link member 100 has the stopper portion 130, and the stopper portion 130 comes into contact with the fixed stopper member 70 to restrict a rotation of the drive link member 100, so that the amount of rotation of the drive link member 100 can be precisely regulated as compared with the configuration in which the amount of rotation of the drive link member is regulated, for example, by actuating and stopping a stepping motor. Further, as compared with the configuration using the stepping motor, the amount of rotation of the drive link member 100 can be precisely regulated with a simple and low-cost structure. Further, since the stopper portion 130 has the first stopper portion 131 and the second stopper portion 132, the amount of rotation of the drive link member 100 can be precisely regulated both when the drive link member 100 rotates in one direction and when rotates in the Opposite direction.

The driving mechanism 50 (drive link member 100) and the fixed stopper member 70 are both fixed to the bracket 60, so that the positional precision between the stopper member 130 and the fixed stopper member 70 can be improved and the amount of rotation of the drive link member 100 can be more precisely regulated.

The fixed stopper member 70 is disposed between the output shaft 52C and the side frame 20, so that upsizing of the drive link member 100 and the fixed stopper member 70 can be suppressed and the structure around the drive link member 100, more specifically, the structure for restricting the rotation of the drive link member 100 can be compact. It is to be noted that downsizing of the drive link member 100 and the structure for restricting the rotation makes it possible to shorten the length of the protruding stopper portion 130, so that a load to be generated when the stopper portion 130 contacts the fixed stopper member 70 can be reduced The stopper portion 130 is provided on the side surface 102 of the drive link member 100, so that the structure of the drive link member 100 can be simplified as compared with an alternative configuration in which the stopper portion protrudes from the link member in a direction of the axis of rotation. Further, the first arm portion 55B of the torsion spring 55 is hooked onto the first stopper portion 131, so that the structure of the drive link member 100 can be simplified as compared with an alternative configuration in which the torsion spring is hooked on another portion (i.e., a portion on which the torsion spring is hooked is provided other than the stopper portion. These configurations make it possible to easily manufacture the drive link member 100.

As seen in FIG. 8 (b), the fastening portions 330 protrude from the gearbox 52B and the side surfaces of the gearbox 52B except for the fastening portions 330 have recessed shapes with respect to the fastening portions 330, so that the driving source 52 with the gearbox 52B can be compactly formed. Further, the protruding fastening portions 330 are arranged at positions avoiding the line LN, so that the side surfaces of the gearbox 52B except for the fastening portions 330 and the end portions of the bent portions 21A of the side frame 20 can be arranged closer to each other. This can suppress upsizing of the side frame 20 and the like and the structure around the driving source 52 can be downsized. Further, one fastening portion 330 is arranged on a laterally outer side of the line LN while two fastening portions 330 are arranged on a laterally inner side of the line LN, so that even in the case where a plurality of fastening portions 330 are provided, the side surfaces of the gearbox 52B and the end portions of the bent portions 21A can be arranged closer to each other. This makes it possible to provide a compact structure around the driving source 52.

Although one embodiment of the present invention has been described above, the present invention is not limited to the above-described embodiment. It is to be understood that modifications and changes may be made to any of the specific configurations as below where necessary without departing from the gist of the present invention.

In the above embodiment, the stopper 210 configured to restrict the amount of rotation of the contact link member 200 is provided on the contact link member 200 itself. However, the present invention is not limited to this configuration, and the stopper may be provided on the drive link member, the bracket, the side frame or the like.

Figure 17:
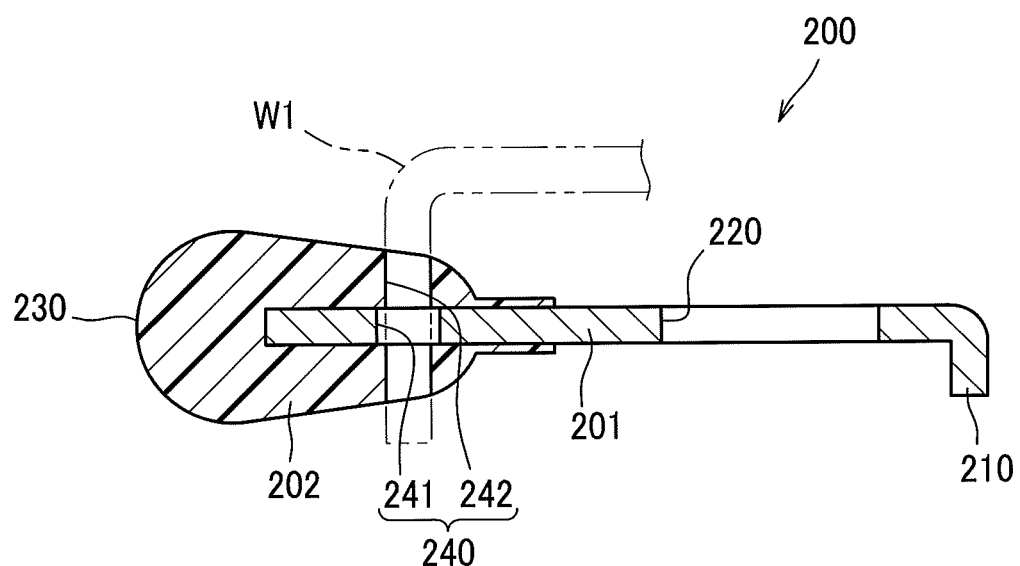
FIG. 17 is a sectional view of the contact link member according to a modified embodiment.

In the above embodiment, the contact link member 200 is provided such that the cover member 202 entirely covers the link body 201. However, the present invention is not limited to this configuration. For example, as seen in FIG. 17, the cover member 202 may partly cover the link body 201. To give more details, the contact link member 200 shown in FIG. 17 includes the metallic link body 201 whose one end portion is covered with the plastic cover member 202 having the contact portion 230. In this structure, the through-hole 240 pierces through the link body 201 and the cover member 202, and the upper connecting wire W1 is inserted into the through-hole 240 so as to prevent the cover member 202 from coming off. Further, in the contact link member 200 shown in FIG. 17, the minimum diameter of the through-hole 242 of the cover member 202 is smaller than that of the through-hole 241 of the link body 201. In this configuration, the upper connecting wire W1 inserted into the through-hole 240 is brought into contact with the inner peripheral surface of the through-hole 242 of the plastic cover member 202, so that contact noise generated between the contact link member 200 and the upper connecting wire W1 can be suppressed.

In the above embodiment, the contact link member 200 includes the link body 201 and the cover member 202, and the link body 201 and the cover member 202 are made of different materials. However, the present invention is not limited to this configuration. For example, the entire contact link member may be made of plastic resin. It is however noted that if the contact link member 200 includes the link body 201 and the cover member 202 having the contact portion 230 as with the above embodiment, each of the link member 201 and the cover 202 can be made of an optimum material in terms of its function. For example, as with the above embodiment, if the link body 201 is made of metal and the cover member 202 is made of plastic resin, rubbing noise generated between the contact link member 200 and the pressure-receiving member 40 can be suppressed and the abrasion can be suppressed while ensuring the rigidity of the entire contact link member 200.

In the above embodiment, the contact portion 230 is approximately spherical in shape. However, the present invention is not limited to this specific configuration. For example, the contact portion may have a convexly curved shape only when viewing from a direction of the axis of rotation of the link member. Further, the sectional shape of the contact portion is not limited to a circular shape (circular arc shape), and may have an elliptic or oval shape.

In the above embodiment, the stopper portion 130 of the drive link member 100 contacts the fixed stopper member 70 fixed to the side frame 20 to restrict a rotation of the drive link member 100. However, the present invention is not limited to this specific configuration. For example, the stopper portion may directly contact the side frame to restrict a rotation of the link member.

In the above embodiment, the stopper portion 130 is provided on the side surface 102 of the drive link member 100. However, the present invention is not limited to this specific configuration. For example, the stopper portion may be provided to protrude from the drive link member in a direction of the axis of rotation of the drive link member. Further, in the above embodiment, the stopper portion 130 includes the first stopper portion 131 and the second stopper portion 132. However, the present invention is not limited to this specific configuration. For example, only one stopper portion may be provided. Further, in the above embodiment, the right-side drive link member 100 and the left-side drive link member 100 are provided using a common part. However, the present invention is not limited to this specific configuration, and the right-side drive link member 100 and the left-side drive link member 100 may be provided using dedicated parts, respectively.

In the above embodiment, the fixed stopper member 70 is fixed to the bracket 60. However, the present invention is not limited to this specific configuration. For example, the fixed stopper member may be directly fixed to the side frame. Further, in the above embodiment, the entire rotation-restricting portion 73 is made of plastic resin. However, the present invention is not limited to this specific configuration. For example, the rotation-restricting portion may be configured such that only the surface thereof to which the stopper portion of the drive link member comes into contact is made of plastic resin. With this configuration as well, contact noise generated between the stopper portion and the rotation-restricting portion can be suppressed, so that noise produced by the actuation of the drive link member can be suppressed.

In the above embodiment, the coil portion 55A of the torsion spring 55 and the upper connecting wire W1 are spaced apart from each other, so that when the pressure-receiving member 40 moves backward, undesired engagement of the upper connecting wire W1 with the coil portion 55A can be suppressed. However, as seen in FIGS. 18 (a) and (b), a cover member 400 may be provided between the coil portion 55A and the upper connecting wire W1.

The cover member 400 is a member configured to partly cover the coil portion 55A of the torsion spring 55, and made of plastic resin, for instance. The cover member 400 includes a cover portion 410 configured to cover the outer peripheral surface of the coil portion 55A, an upper engagement portion 420 provided above the coil portion 55A and extending from an upper end of the cover portion 410 to be placed on the pin 54, and a lower engagement portion 430 configured to extend from a lower end of the cover member 410 so as to detour around the contact link member 200 into the lower side of the contact link member 200 to engage with the contact link member 200.

When the contact link member 200 is in the initial position, the cover member 410 extends along the outer peripheral surface of the coil portion 55A from a position at which the cover member 410 covers that portion of the coil portion 55A which is the nearest to the upper connecting wire W1 to a position at which the cover member 410 covers the rear portion of the coil portion 55A, so that the cover member 410 is located between the coil portion 55A and the upper connecting wire W1.

The upper engagement portion 420 has an engagement protrusion 421 protruding from a lower surface thereof. The engagement protrusion 421 engages an engagement recess portion 54A formed on the upper surface of the pin 54, so that the upper engagement portion 420 engages the pin 54.

With the provision of the cover member 400 configured as described above, when the pressure-receiving member 40 moves backward and the upper connecting wire W1 is caused to move backward to a large extent, the upper connecting wire W1 comes into contact with the cover member 410 without contacting the coil portion 55A. This can minimize undesired engagement of the upper connecting wire W1 with the coil portion 55A. Further, the cover member 400 is made of plastic resin in this modified embodiment, so that noise generated when the upper connecting wire W1 contacts the cover member 410 can be suppressed.

In the above embodiment, the pressure-receiving member 40 does not contact the driving source 52. However, the vehicle seat may be configured such that the pressure-receiving member 40 contacts the driving source 52. For example, the lowermost second bead B2 among the second beads B2 provided on the pressure-receiving member is disposed substantially at the same height position as that of the upper end portion of the driving source 52, and this second bead B2 may contact the driving source 52 in the initial position.

Figure 19:
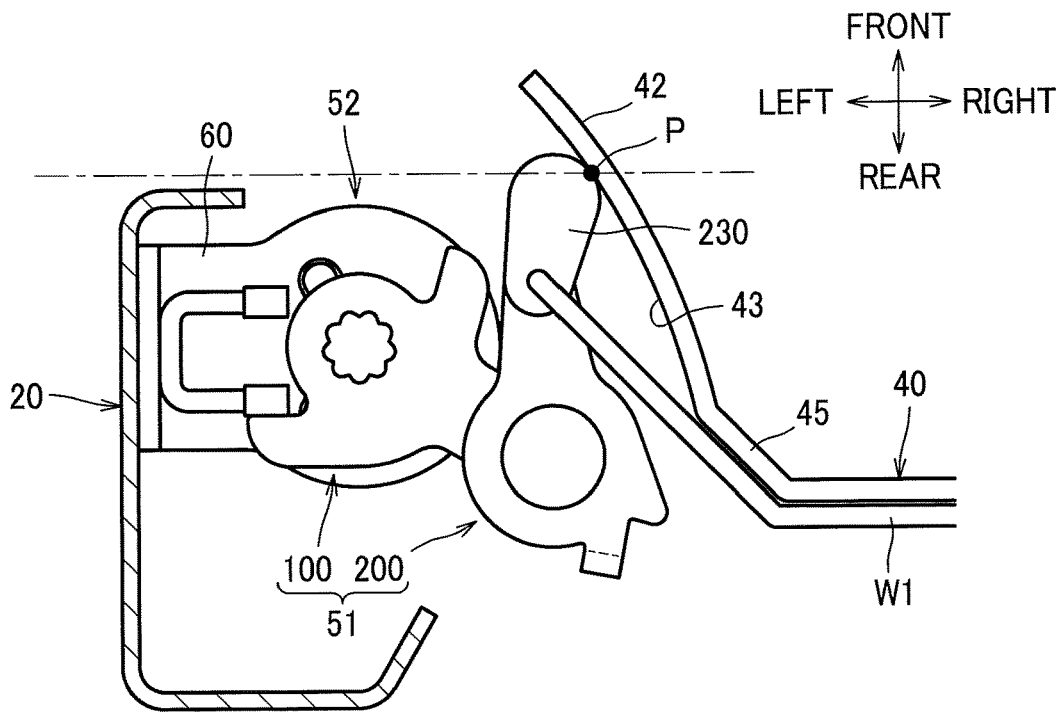
FIG. 19 shows a second modification and is a sectional view illustrating the positional relation between the contact link member, the pressure-receiving member, and the side frame.

In the above embodiment, when in the advanced position, the contact point P of the contact link member 200 and the pressure-receiving member 40 is located frontward farther than the front end of the side frame 20. However, as seen in FIG. 19, even in the initial position, the contact point P of the contact link member 200 and the pressure-receiving member 40 may be located frontward farther than the front end of the side frame 20. In other words, the contact point P of the contact link member 200 and the pressure-receiving member 40 may always be located frontward farther than the front end of the side frame 20.

Figure 20:
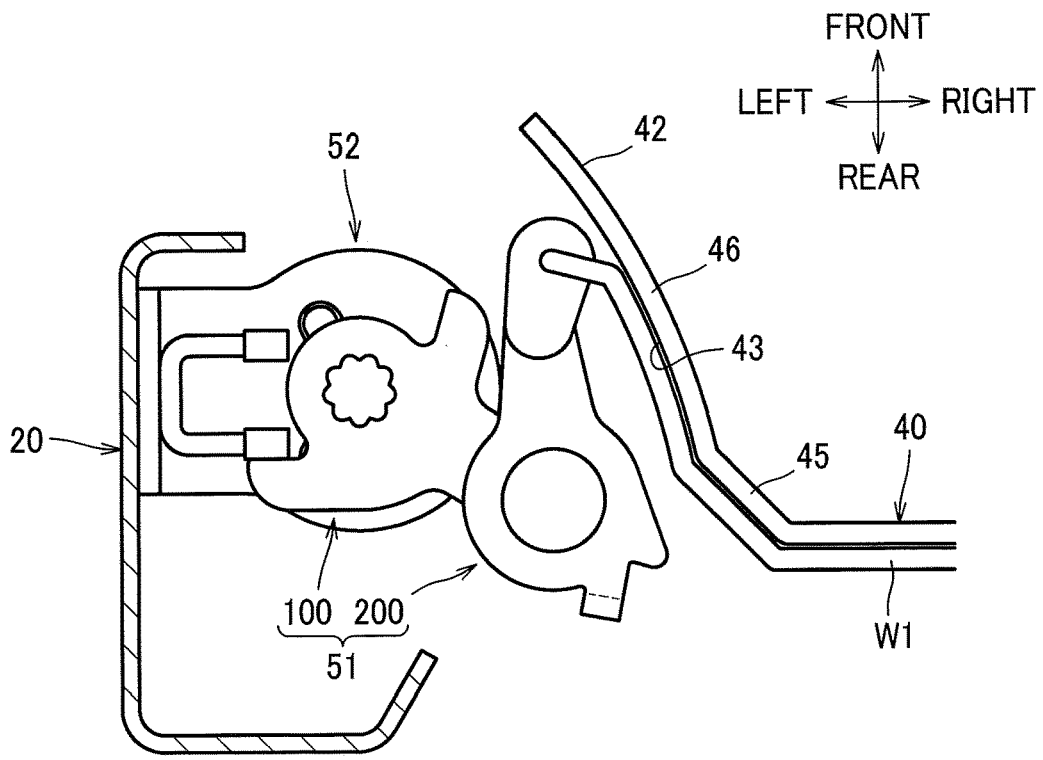
FIG. 20 shows a third modification and is a sectional view illustrating the upper connecting wire and the pressure-receiving member.

In the above embodiment, the contact portion 230 of the contact link member 200 is configured to contact the pressure-receiving member 40. However, as seen in FIG. 20, the contact link member 200 may be provided so as not to contact the pressure-receiving member 40.

To be more specific, the upper connecting wire W1 extends along the pressure-receiving member 40 while contacting the first support portion 45 of the pressure-receiving member 40 and the second support portion 46 of the pressure-receiving member 40 that is provided laterally outward of the first support portion 45; the upper connecting wire W1 is bent and extends frontward from a portion thereof contacting the first support portion 45 along the second support portion 46. The upper connecting wire W1 is then bent such that each right and left end portion extends away from the second support portion 46, and connected to the contact link member 200. The contact link member 200 does not contact the pressure-receiving member 40 when it moves from the initial position to the advanced position.

It is preferable that the both right and left ends of the upper connecting wire W1 extend along the second support portions 46, and more preferably, the right and left ends of the upper connecting wire W1 extend outward along the second support portions 46 beyond the laterally mid point of each of the second support portions 46 in order to push the pressure-receiving member 40 at positions closer to its laterally outer portions by the upper connecting wire W1. With this configuration, the pressure-receiving member 40 can be stably supported by the upper connecting wire W1.

Figure 21:
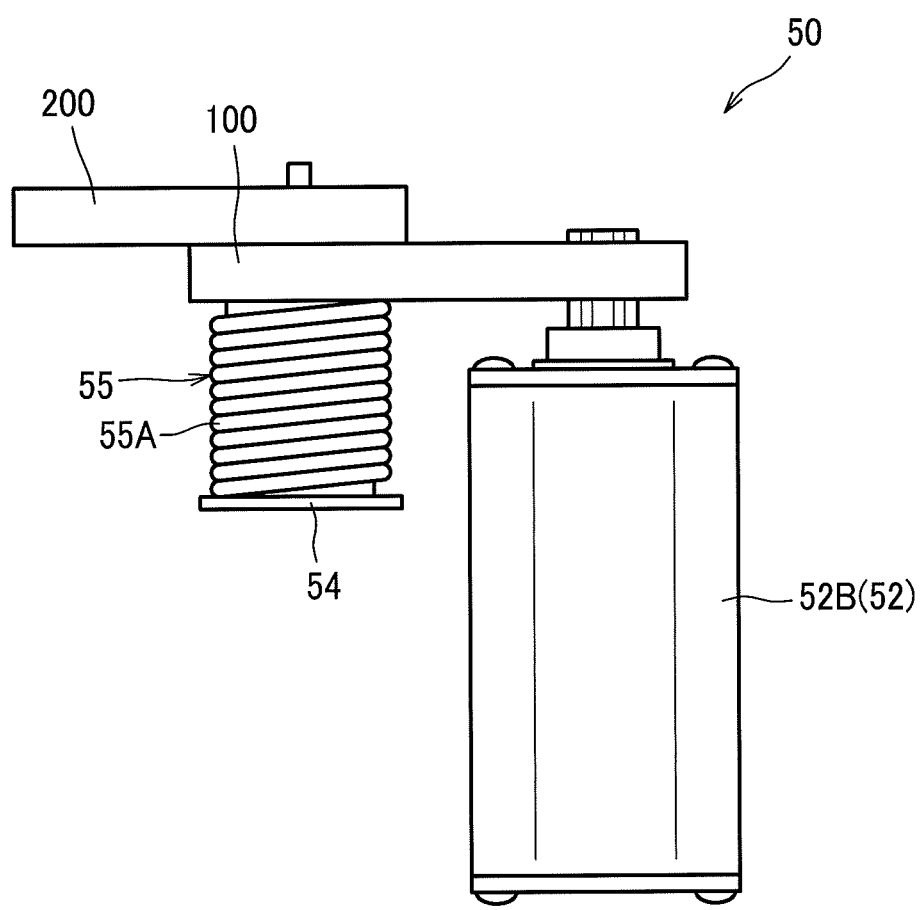
FIG. 21 shows a fourth modification and is a view illustrating the positional relation between the driving source and a torsion spring.

In the above embodiment, the coil portion 55A of the torsion spring 55 is disposed on the opposite side of the contact link member 200 from the driving source 52, and as viewed from the upper-lower direction, the coil portion 55A is disposed to overlap the driving source 52. However, the arrangement of the driving source and the torsion spring is not limited to this specific arrangement. For example, as seen in FIG. 21, the coil portion 55A of the torsion spring 55 may be disposed on the same side of the contact link member 200 as that on which the driving source 52 is disposed so that the coil portion 55A and the driving source 52 overlap each other in the horizontal direction. This configuration makes it possible to reduce the size of the driving mechanism 50 in the upper-lower direction.

As seen in FIG. 22 (a), the pressure-receiving member 40 may have cut portions 47 at portions corresponding to the shoulders of an occupant, i.e., at right and left upper end portions. To be more specific, the upper end of each of the support portions 42 is provided at a position one step lower than the upper end of the pressure-receiving member 41. An occupant may look back, while driving a car in reverse, and take a posture with his/her one shoulder directed rearward. In so doing, if the cut portions 47 are not provided on the pressure-receiving member 40, an occupant may find difficulty in looking back because when the pressure-receiving member 40 moves in a direction opposite to the occupant's posture due to the steering maneuver of the occupant, the advanced support portion 42 contacts the occupant's shoulder.

Further, as seen in FIGS. 22 (a) and (b), the pressure-receiving member 40 may be easily bendable at its laterally center portion. To be more specific, the pressure-receiving member 40 has bend lines extending in the upper-lower direction (e.g., groove 48 recessed as viewed from the front side) at the laterally center portion thereof, and this portion with the grooves 48 is thinner than other portions. This pressure-receiving member 40 is bent at the groove 48 when the support portion 42 of the pressure-receiving member 40 is pushed forward by the driving mechanism 50, so that the right-side support portion 42 and the left-side support portion 42 are independently movable. It is to be noted that the groove 48 may be recessed as viewed from the rear side, or both the front side and the rear side thereof may be recessed. The bend line is not limited to the groove, and a perforated line extending in the upper-lower direction may be provided at the laterally center portion of the pressure-receiving member 40.

Figure 23:
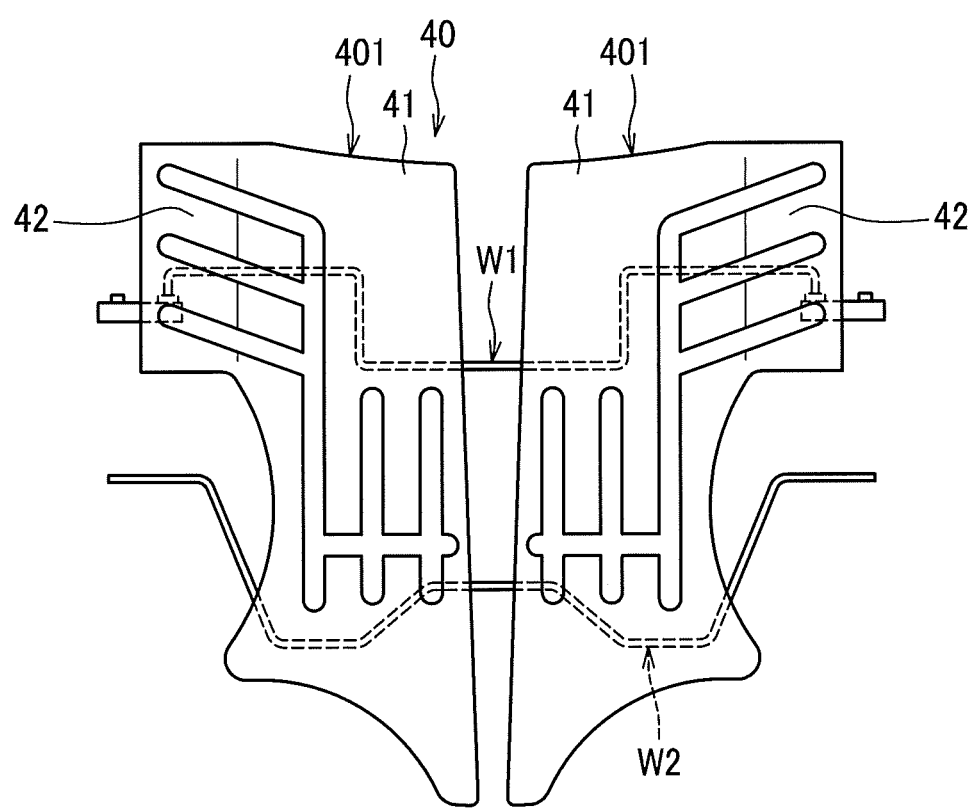
FIG. 23 shows a sixth modification and is a front view of the pressure-receiving member.

Further, the pressure-receiving member 40 may be divided into right and left halves by the center portion thereof. For example, as seen in FIG. 23, the pressure-receiving member 40 may consist of two plate members 401 arranged side by side. The two plate members 401 may be connected at their lower end portions. According to these pressure-receiving members 40, the right-side support portion 42 and the left-side support portion 42 can be moved more independently.

Figure 24:
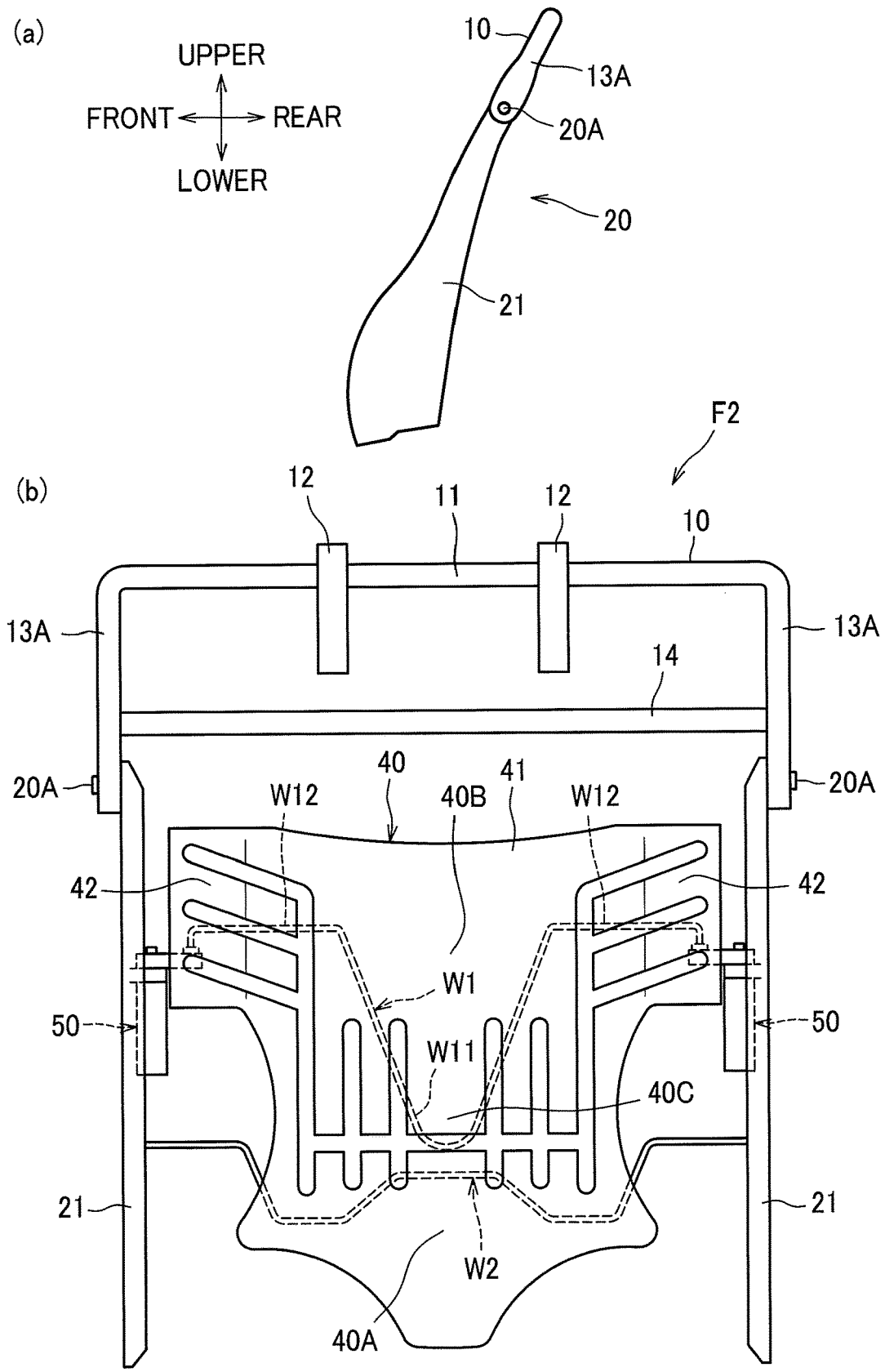
FIG. 24 shows a seventh modification and includes a side view (a) illustrating the seat back frame and a front view (b) illustrating the pressure-receiving member and the seat back frame.

In the above embodiment, the bent portion W11 of the upper connecting wire is of U-shape. However, as seen in FIG. 24 (b), the bent portion W11 may be of V-shape with the lower end portion thereof disposed in the laterally center portion of the third portion 40C. With this configuration, the upper connecting wire W1 can push the pressure-receiving member 40 at the narrowed portion as well, so that the pressure-receiving member 40 is easily twistable at the third portion 40C. Further, since the upper connecting wire W1 supports not only the second portion 40B but also the third portion 40C from the rear side, an occupant can be stably supported by the pressure-receiving member 40.

In the above embodiment, the upper frame 10 is fixed to the side frame main body portions 21. However, the configuration of the seat back frame F2 is not limited to this specific configuration. For example, as seen in FIG. 24 (a), the upper frame 10 may be supported by the side frame main body portions 21 so as to be rotatable frontward and rearward relative thereto.

To be more specific, the upper frame 10 includes a pair of right and left upper side frames 13A rotatably connected to the side frame main body portions 21. Further, as seen in FIG. 24 (b), the upper frame 10 includes a cross-member 14 configured to connect the pair of upper side frames 13A.

The pressure-receiving member 40 is supported by this seat back frame F2 such that the first portion 40A and the second portion 40B are supported by the side frame main body portions 21 with both the driving mechanisms 50 and the lower connecting wire W2 being fixed to the side frame main body portions 21. With this configuration, the pressure-receiving member 40 does not move by the rotation of the upper frame 10, so that an uncomfortable feeling experienced by an occupant can be suppressed.

Each driving mechanism 50 as a whole is disposed below the axis of rotation 20A on which the upper frame 10 is rotatable with respect to the side frame main body portions 21. This can prevent the driving sources 52 and other parts constituting the driving mechanisms 50 from protruding rearward to a large extent from the seat back frame F2 when the upper frame 10 rotates frontward.

Further, the upper end of the pressure-receiving member 40 is disposed below the cross-member 14, more specifically, the axis of rotation 20A on which the upper frame 10 is rotatable with respect to the side frame main body portions 21. This can prevent the upper end portion of the pressure-receiving member 40 from protruding rearward to a large extent from the seat back frame F2 when the upper frame 10 rotates frontward. Further, since the cross-member 14 is disposed above the pressure-receiving member 40, the upper body of an occupant is apt to sink into the seat back S2 in a rear-end collision.

Figure 25:
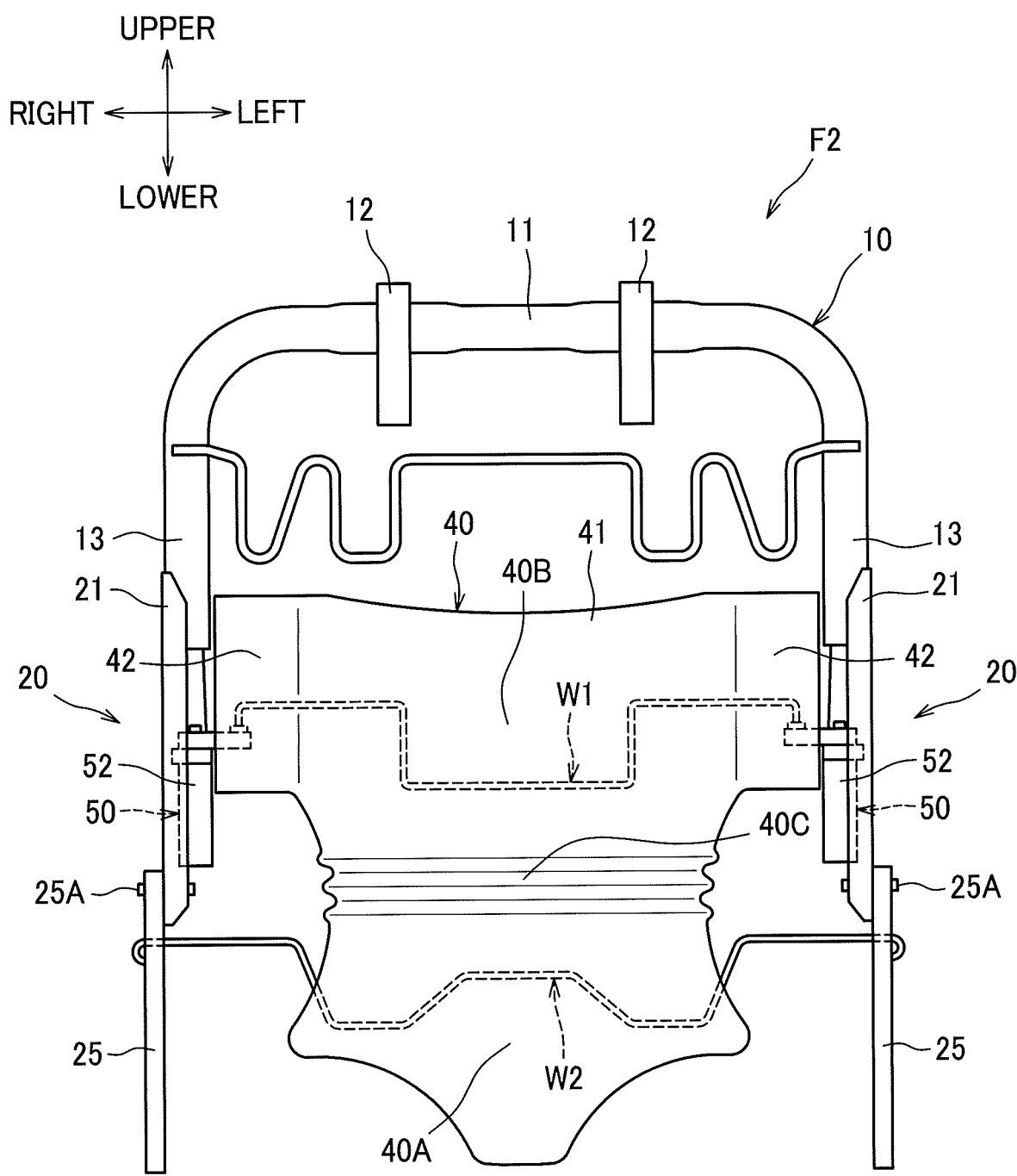
FIG. 25 shows an eighth modification and includes a front view illustrating the pressure-receiving member and the seat back frame.

As seen in FIG. 25, in the case where the seat back frame F2 is configured to be rotatable around the axis of rotation 25A provided at a lower portion thereof, the pressure-receiving member 40 may be provided such that the first portion 40A thereof is disposed below the axis of rotation 25A and the second portion 40B thereof is disposed above the axis of rotation 25A.

To be more specific, the seat back frame F2 includes right and left lower side frames 25 each having an upper end portion to which the lower end of the corresponding side frame main body portion 21 is rotatably connected. The driving sources 52 are fixed to the side frame main body portions 21, and the lower connecting wire W2 is fixed to the lower side frames 25. In other words, the first portion 40A of the pressure-receiving member 40 is supported by the lower side frames 25, and the second portion 40B of the pressure-receiving member 40 is supported by the side frame main body portions 21.

The third portion 40C of the pressure-receiving member 40 is provided substantially at the same height as that of the axis of rotation 25A of the seat back frame F2, and a bend line is formed by which the second portion 40B is easily swingable frontward and rearward relative to the first portion 40A. The bend line may be a groove, perforated line or bellows as shown in FIG. 25. With this configuration, when the side frame main body portions 21 are tilted frontward around the axis of rotation 25A, the second portion 40B moves frontward in accordance with the movement of the side frame main body portions 21, so that an uncomfortable feeling experienced by an occupant can be suppressed.

Further, the third portion 40C may be configured to be stretchable in the upper-lower direction so that the second portion 40B can easily move in accordance with the movement of the side frame main body portions 21 if the third portion 40C is located in a position shifted frontward or rearward with respect to the axis of rotation 25A. In this example, the third portion 40C may be folded into bellows for instance.

In the above embodiment, each of the side frame main body portions 21 is made of a single unitary part. However, the structure of the side frame main body portion 21 is not limited to this specific one, and as seen in FIG. 26, the side frame main body portion 21 may be made of upper and lower plates (two plates).

To be more specific, the side frame main body portion 21 consists of an upper frame 211 and a lower frame 212 disposed under the upper frame 211. The upper frame 211 and the lower frame 212 are fixed to each other by welding, a screw or other means.

The second bracket 62 for supporting the driving source 52 is provided to overlap a boundary defined between the upper frame 211 and the lower frame 212. The fixing portion 62B of the second bracket 62 includes an upper fixing portion 62D fixed to the upper frame 211 by a bolt, and a lower fixing portion 62E extending downward from the upper fixing portion 62D and fixed to the lower frame 212 by a bolt. The upper frame 211 and the lower frame 212 can be fixed more firmly by this second bracket 62.

Figure 26:
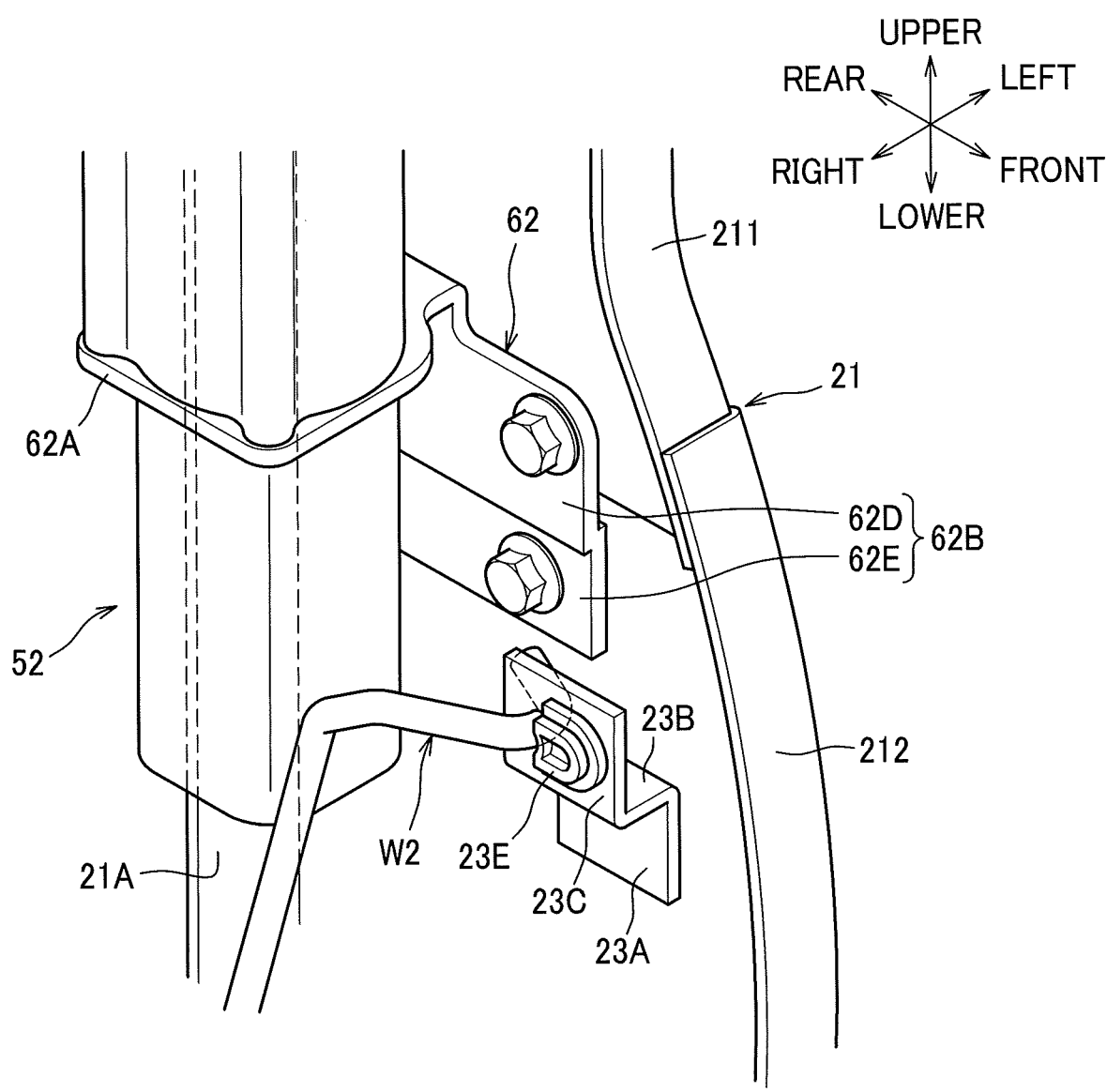
FIG. 26 shows a ninth modification and is a perspective view illustrating the side frame, the second bracket, and the driving source.

In the case where the side frame main body portion 21 consists of the horizontally divided upper frame 211 and lower frame 212 as seen in FIG. 26, the first bracket 61 and the second bracket 62 may be arranged at positions avoiding a connecting portion by which the upper frame 211 and the lower frame 212 are connected, namely, the boundary between the upper frame 211 and the lower frame 212.

As seen in FIGS. 27 (a) and (b), in the case where an air bag device A is attached to a laterally outer side of the side frame main body portion 21, an attachment hole 21B for webbing A1, through which the webbing A1 configured to restrict a direction of deployment of a bag member of the air bag device A is attached to the side frame main body portion 21, may be provided at a position not overlapping the first bracket 61 (see FIG. 5) or the second bracket 62. To be more specific, the attachment hole 21B is provided at a position laterally overlapping the motor 52A that is thinner in width than other portions of the driving source 52, such as the gearbox 52B. Further, the attachment hole 21B is provided at a position not overlapping in the lateral direction (i.e., at a position shifted in the vertical direction from) the contact link member 200 or the fixed stopper member 70.

Herein, the structure around the air bag device A in the seat back S2 will be briefly described. The air bag device A includes various parts such as a bag member (not shown) and an inflator (not shown), and is fixed to the side frame main body portion 21 via a support plate A3. The air bag device A is disposed at a position laterally overlapping the driving source 52.

The webbing A1 is disposed to surround the air bag device A; a front end portion of the webbing A1 and an outer skin material BP5 are sewed together at a tear-off portion BP51 of the outer skin material BP5, and a rear end portion of the webbing A1 is fixed to the side frame main body portion 21. When the air bag device A is actuated, the bag member that is being expanded. using a gas generated by the inflator is guided to expand frontward by the right and left webbing A1, breaks the outer skin material BP5 at the tear-off portion BP51, and deploys at a side of an occupant Rear end portions of the webbing A1 are fixed to rivet-like webbing attachment members A2. One of the webbing attachment members A2 is engaged with the attachment hole 21B and fixed to the side frame main body portion 21. The other one of the webbing attachment members A2 is engaged with the rear-side bent portion 21A of the side frame main body portion 21 and fixed to the side frame main body portion 21.

According to this modified embodiment, since the attachment hole 21B is provided in such a position that it does not overlap the first bracket 61 or the second bracket 62, interference between the webbing attachment member A2 engaged in the attachment hole 21B and the brackets 61, 62 can be suppressed. Further, since the attachment hole 21B is provided in such a position that it laterally overlaps the motor 52A, the size of the side frame main body portion 21 can be reduced as compared with an alternative configuration in which the attachment hole 21B is provided in such a position that it does not overlap the motor 52A (driving source 52). Further, since the motor 52A is a portion thinner than other portions of the driving source 52, interference between the webbing attachment member A2 and the driving source 52 can be suppressed. Furthermore, since the webbing attachment member A2 is disposed in such a position that it does not overlap in the lateral direction the drive link member 100, the contact link member 200, or the fixed stopper member 70, the lateral size of the seat back S2 can be reduced as compared with an alternative configuration in which any of the link members 100, 200 and the fixed stopper member 70 is provided at the same height as that of the webbing attachment member A2. Further, since the air bag device A is disposed in such a position that it overlaps in the lateral direction the driving source 52, the size of the side frame main body portion 21 can be reduced in the upper-lower direction.

A further attachment hole 21B may be provided at a position above the driving source 52, and the rear end portions of the webbing A1 may be fixed to the side frame main body portion 21 at upper and lower portions (two portions) of the side frame main body portion 21. In this modification, the driving source 52 is disposed between the two attachment holes 21B, so that the size of the side frame main body portion 21 can be reduced in the front-rear direction as well as in the upper-lower direction. The air bag device A may be arranged so as not to overlap in the lateral direction the driving source 52, namely, at a position shifted in the front-rear direction from the driving source 52. In this modification, since the driving source 52 and the webbing attachment member A2 do not overlap each other in the lateral direction, the size of the seat bag S2 can be reduced in the lateral direction.

In the above embodiment, the torsion spring 55 is exemplified as an example of an urging member. However, the present invention is not limited to this specific configuration. For example, a leaf spring may be used instead. Further, in the above embodiment, the upper connecting wire W1 is exemplified as an example of a second urging member. However, the present invention is not limited to this specific configuration. For example, a coil spring may be used instead. In the above embodiment, the upper connecting wire W1 and the torsion spring 55 are exemplified as an example of a rotation resistive member. However, the present invention is not limited to this specific configuration. For example, the urging member, the second urging member, and the rotation resistive member may be made of independent and discrete members, respectively.

In the above embodiment, a part of the extension portion 62C of the second bracket 62 fixed to the side frame 20 is disposed on the bulging portion 22 of the side frame 20. However, the present invention is not limited to this specific configuration. For example, the extension portion as a whole may be disposed on the bulging portion 22.

The structure of the bracket 60 shown in the above embodiment has been explained by way of example only. For example, although the fixing portion 62B of the second bracket 62 has the extension portion 62C, the present invention is not limited to this specific configuration, and the fixing portion of the first bracket may have an extension portion. Further, referring to FIG. 8 (a) for a reference purpose, the engagement portion 62A of the second bracket 62 may engage the lower end portion of the driving source 52, and the fixing portion 62B may extend down to a position lower than the lower end of the driving source 52. Further, in the above embodiment, the bracket 60 includes two brackets, namely, the first bracket 61 and the second bracket 62. However, the present invention is not limited to this specific configuration, and the bracket may consist of one bracket.

In the above embodiment, the linkage 51 includes two links (the drive link member 100 and the contact link member 200). However, the present invention is not limited to this specific configuration. For example, the linkage may include one link member, or alternatively three or more link members.

The above embodiments have been illustrated as examples in which the present invention is applied to a seat used in an automobile (i.e., car seat S). However, the present invention is not limited thereto, and applicable to any other seat used in other vehicles, such as rail cars, ships and aircraft.

The invention claimed is:

1. A vehicle seat comprising:
   a frame including:
     right and left side frames, and
     a connecting member connecting the right and left side frames; and
   a pressure-receiving member disposed between the right and left side frames to support an occupant, the pressure-receiving member including:
     a pressure-receiving portion located in a center of the pressure-receiving member, and
     right and left support portions extending from right and left sides of the pressure-receiving portion, respectively,
     wherein the pressure-receiving member comprises:

a first reinforcing portion extending in each of the left and right support portions, the first reinforcing portion being an elongated portion extending from a laterally outer end portion of a corresponding support portion toward the center of the pressure-receiving member, the first reinforcing portion having a first end adjacent to a corresponding side frame and a second end located closer than the first end to the center of the pressure-receiving member, a second reinforcing portion extending in a direction non-parallel to a direction in which the first reinforcing portion extends, the second reinforcing portion being connected to the second end of the first reinforcing portion, and a relief portion located between the first end and the second end of the first reinforcing portion in a position that overlaps the first reinforcing portion, the relief portion having a recessed shape.

2. The vehicle seat according to claim 1, wherein the first reinforcing portion extends from the corresponding support portion beyond an adjacent side of the pressure-receiving portion toward the center of the pressure-receiving member.

3. The vehicle seat according to claim 1, wherein
the pressure-receiving member further comprises two other reinforcing portions extending in each of the left and right support portions parallel to the first reinforcing portion, and
the relief portion is located between the two other reinforcing portions.

4. The vehicle seat according to claim 1, wherein the pressure-receiving member further comprises a third reinforcing portion extending in a direction non-parallel to the direction in which the first reinforcing portion extends.

5. The vehicle seat according to claim 1, further comprising:

a plurality of wires provided at the pressure-receiving member to attach the pressure-receiving member to the side frame,
wherein the second reinforcing portion is provided between the wires.

6. The vehicle seat according to claim 1, further comprising:

a pad with which the side frame is covered,
wherein the pressure-receiving member has a first side surface in contact with the pad and a second side surface facing away from the pad, and
wherein the first reinforcing portion is formed on the second side surface of the pressure-receiving member.

7. The vehicle seat according to claim 1,
wherein the right and left sides of the pressure-receiving portion include inwardly recessed portions provided adjacent to portions of the right and left sides of the pressure-receiving portion from which the right and left support portions extend, to form a constricted portion of the pressure-receiving portion, and
wherein an outer end of the first reinforcing portion extends laterally outward relative to an outermost edge of the constricted portion.

8. The vehicle seat according to claim 1,
wherein the right and left sides of the pressure-receiving portion include inwardly recessed portions provided adjacent to portions of the right and left sides of the pressure-receiving portion from which the right and left support portions extend, to form a constricted portion of the pressure-receiving portion, and
wherein an inner end of the reinforcing portion extends laterally inward relative to an innermost edge of the constricted portion.

9. The vehicle seat according to claim 1, wherein the right and left support portions extend obliquely from the right and left sides of the pressure-receiving portion, respectively, toward a side on which the occupant is to be seated.

* * * * *